United States Patent
Mausolf et al.

(10) Patent No.: US 8,205,208 B2
(45) Date of Patent: Jun. 19, 2012

(54) SCHEDULING GRID JOBS USING DYNAMIC GRID SCHEDULING POLICY

(75) Inventors: Jeffry Richard Mausolf, Austin, TX (US); Kimberly Ann Stephens, Austin, TX (US)

(73) Assignee: Internaitonal Business Machines Corporation, Armonk, NY (US)

( * ) Notice: Subject to any disclaimer, the term of this patent is extended or adjusted under 35 U.S.C. 154(b) by 1190 days.

(21) Appl. No.: 11/782,155

(22) Filed: Jul. 24, 2007

(65) Prior Publication Data

US 2009/0031312 A1 Jan. 29, 2009

(51) Int. Cl.
*G06F 9/46* (2006.01)
*G06F 15/16* (2006.01)
(52) U.S. Cl. .................. 718/104; 718/102; 709/201
(58) Field of Classification Search .................. None
See application file for complete search history.

(56) References Cited

U.S. PATENT DOCUMENTS

| 7,082,606 | B2 | 7/2006 | Wood et al. |
| 2003/0187915 | A1 | 10/2003 | Sun et al. |
| 2004/0034130 | A1* | 2/2004 | Kageyama et al. ........... 524/107 |
| 2005/0034130 | A1 | 2/2005 | Skovira |
| 2005/0283782 | A1 | 12/2005 | Lu et al. |
| 2006/0017969 | A1 | 1/2006 | Ly et al. |
| 2006/0048157 | A1 | 3/2006 | Dawson et al. |
| 2006/0167966 | A1* | 7/2006 | Kumar et al. .................. 709/201 |
| 2007/0094662 | A1* | 4/2007 | Berstis et al. .................. 718/102 |
| 2007/0180451 | A1* | 8/2007 | Ryan et al. ..................... 718/104 |

FOREIGN PATENT DOCUMENTS

WO 2005089245 9/2005

* cited by examiner

*Primary Examiner* — Jennifer To
*Assistant Examiner* — Bing Zhao
(74) *Attorney, Agent, or Firm* — Yee & Associates, P.C.; Mark C. Vallone

(57) ABSTRACT

The illustrative embodiments described herein provide a computer-implemented method, apparatus, and computer program product for scheduling grid jobs. In one embodiment, a process identifies information describing available resources on a set of nodes on a heterogeneous grid computing system to form resource availability information. The process identifies a set of static scheduling policies for a set of static schedulers that manage the set of nodes. The process also identifies a static scheduling status for a portion of the set of static schedulers. The process creates a dynamic grid scheduling policy using the resource availability information, the set of static scheduling policies, and the static scheduling status. The process also schedules a set of grid jobs for execution by the available resources using the dynamic grid scheduling policy.

26 Claims, 10 Drawing Sheets

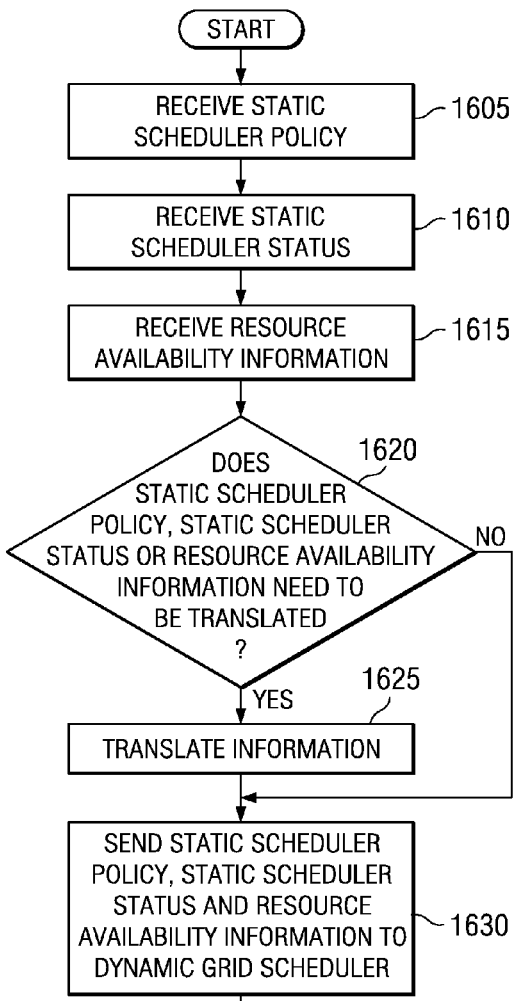

JOB ATTRIBUTES
1200

| 1205 | JOB NAME |
| 1210 | JOB PRIORITY |
| 1215 | JOB QUEUE TIME |
| 1220 | REQUESTED NUMBER OF CPU'S |
| 1225 | REQUESTED CPU CLOCK SPEED |
| 1230 | REQUESTED DISK SPACE |
| 1235 | REQUESTED MEMORY |
| 1240 | WALL CLOCK TIME |
| 1245 | ASSOCIATED SERVICE LEVEL |

*FIG. 12*

RESOURCE AVAILABILITY INFORMATION
1300

| 1305 | MACHINE Blade14.austin.ibm.com |
| 1310 | ARCHITECTURE INTEL |
| 1315 | OPERATING SYSTEM LINUX |
| 1320 | TOTAL VIRTUAL MEMORY 2,031,464 |
| 1325 | TOTAL DISK SPACE 21,940,568 |
| 1330 | TOTAL CPU'S 4 |
| 1335 | TOTAL MEMORY 2534 |

| 1401 | 1403 | 1406 |
|---|---|---|
| NUMBER OF HIGH PRIORITY JOBS QUEUED 1410 | NUMBER OF MEDIUM PRIORITY JOBS QUEUED 1420 | NUMBER OF LOW PRIORITY JOBS QUEUED 1430 |
| MINIMUM NUMBER OF CPU'S REQUESTED 1411 | MINIMUM NUMBER OF CPU'S REQUESTED 1421 | MINIMUM NUMBER OF CPU'S REQUESTED 1431 |
| MAXIMUM NUMBER OF CPU'S REQUESTED 1412 | MAXIMUM NUMBER OF CPU'S REQUESTED 1422 | MAXIMUM NUMBER OF CPU'S REQUESTED 1432 |
| MINIMUM DISK SPACE REQUESTED 1413 | MINIMUM DISK SPACE REQUESTED 1423 | MINIMUM DISK SPACE REQUESTED 1433 |
| MAXIMUM DISK SPACE REQUESTED 1414 | MAXIMUM DISK SPACE REQUESTED 1424 | MAXIMUM DISK SPACE REQUESTED 1434 |
| MINIMUM MEMORY REQUESTED 1415 | MINIMUM MEMORY REQUESTED 1425 | MINIMUM MEMORY REQUESTED 1435 |
| MAXIMUM MEMORY REQUESTED 1416 | MAXIMUM MEMORY REQUESTED 1426 | MAXIMUM MEMORY REQUESTED 1436 |
| MINIMUM JOB WAIT TIME 1417 | MINIMUM JOB WAIT TIME 1427 | MINIMUM JOB WAIT TIME 1437 |
| MAXIMUM JOB WAIT TIME 1418 | MAXIMUM JOB WAIT TIME 1428 | MAXIMUM JOB WAIT TIME 1438 |

1400

STATIC SCHEDULER STATUS INFORMATION

*FIG. 14*

SCHEDULING GRID JOBS USING DYNAMIC GRID SCHEDULING POLICY

BACKGROUND OF THE INVENTION

1. Field of the Invention

The present invention relates generally to a data processing system and in particular to a method and system for scheduling grid jobs. More particularly, the present invention is directed to a computer-implemented method, apparatus, and computer-usable program code for scheduling grid jobs using a dynamic grid scheduling policy.

2. Description of the Related Art

In the 1990's, computer scientists began exploring the design and development of a computer infrastructure, referred to as the computation grid, whose design was based on the electrical power grids that had been known to date. Grid computing was initially designed for use with large-scale, resource intensive scientific applications, such as the Search for Extraterrestrial Intelligence (SETI) program's computing grid. This type of application requires more resources than a small number of computing devices can provide in a single administrative domain. Since then, grid computing has become more prevalent as it has increased in popularity as a mechanism for handling computing jobs. For example, grid computing is implemented by the World Community Grid, which is an Internet-connected grid of computers that are used to advance public interest and scientific research projects for the benefit of humanity.

Computing jobs that are executable by a grid computing system are grid jobs. A grid job is any job capable of being utilized on a grid computing system. For example, a grid job may perform a mathematical calculation or obtain a sampling result based on input for a particular sampling formula. Grid jobs may also perform computations in a larger grid project. Examples of grid projects include applications for modeling protein folding, financial modeling, earthquake simulation, and climate/weather modeling.

A computation grid enables computer resources from geographically distributed computing devices to be shared and aggregated in order to solve large-scale resource intensive problems. A computational grid may also be referred to as just a "grid." To build a grid, both low-level and high-level services are needed. The grid's low-level services include security, information, directory, and resource management services. The high-level services include tools for application development, resource management, resource scheduling, and the like. Among these services, the resource management and scheduling tends to be the most challenging to perform optimally.

Static schedulers manage a dedicated set of resources on a set of nodes that are defined by the configuration of a computing device on which the static scheduler is executed. A node is a computing device that contains resources, such as processing speed, memory capacity, and hard disk space. Examples of static schedulers include Load Sharing Facility from Platform Computing and Portable Batch System from Altair. Computing jobs that need to be executed are held in a job queue managed by the static scheduler. A static scheduler then uses a static scheduling policy to determine how resources in the set of nodes managed by the static scheduler are utilized.

Static scheduling policies are often defined for particular classes of applications that require particular types of resources. For example, some static scheduling policies may specialize in allocating node resources to parallel jobs that require identical platforms. Other static scheduling policies may specialize in executing jobs on nodes having resources that are logically partitioned based on factors such as processing speed, architecture, and type of operating system.

Static scheduling policies can fail to efficiently utilize resources for applications and resources that fall outside the scope of the policy. In one example, multiple parallel jobs that require multiple nodes may be executed by nodes that are managed by a static scheduling policy that specializes in scheduling parallel jobs. However, in this example, inefficiencies can occur when an insufficient number of nodes are available to process the next parallel job in a job queue. The static scheduler may then fail to utilize idle nodes to execute non-parallel jobs. For example, non-parallel jobs that could be run on the idle nodes may be queued in a job queue that is not associated with the nodes.

Also, the static scheduler associated with the idle nodes may not have the functionality to execute non-parallel jobs. As a result, resources that could be used to execute non-parallel jobs are left idle, and are therefore under-utilized. Although some static schedulers use a backfill policy to utilize idle nodes, jobs that are submitted to a static scheduler tend to belong to the same job class, thereby preventing the utilization of idle nodes. For example, a static scheduler having the infrastructure for parallel processing may fail to receive non-parallel jobs for processing if the user or application submitting jobs to the static scheduler submits only parallel jobs.

The above example also illustrates that static schedulers having static scheduling policies are ineffective at scheduling jobs in a heterogeneous grid computing system having multiple application and resource types. A heterogeneous grid computing system is a grid computing system in which at least two static schedulers in the grid computing system have different properties. For example, the static schedulers may have different statuses, manage different resource types, administer different policies, or specialize in different application or job types. The static schedulers in a heterogeneous grid computing system may also originate from different sources, entities, or manufacturers. In a heterogeneous grid computing system that is managed by a set of static scheduler policies, no single global policy exists that dynamically schedules jobs across resources managed by the set of static scheduler policies while still taking into account the instructions set forth by the set of static scheduler policies.

Also, each static scheduler that manages nodes in a heterogeneous environment may use a different system specific language. Because the various languages of the multiple static schedulers are not normalized into a uniform medium, problems may arise in coordinating the policies, status information, and resource availability information of each static scheduler into a comprehensive policy for managing all of the nodes in the heterogeneous environment.

SUMMARY OF THE INVENTION

The illustrative embodiments described herein provide a computer-implemented method, apparatus, and computer program product for scheduling grid jobs. In one embodiment, a process identifies information describing available resources on a set of nodes on a heterogeneous grid computing system to form resource availability information. The process identifies a set of static scheduling policies for a set of static schedulers that manage the set of nodes. The process also identifies a static scheduling status for a portion of the set of static schedulers. The process creates a dynamic grid scheduling policy using the resource availability information, the set of static scheduling policies, and the static scheduling status. The process also schedules a set of grid jobs for execution by the available resources using the dynamic grid scheduling policy.

In another embodiment, the process receives the resource availability information, the set of static scheduling policies, and the scheduling status from a set of informational providers. In this embodiment, the resource availability information, the set of static scheduling policies, and the static scheduling status may be received from the set of informational providers in response to querying the set of informational providers. In one non-limiting example, the total number of informational providers in the set of informational providers equals the total number of static schedulers in the set of static schedulers.

In an alternate embodiment, the process receives the resource availability information, the set of static scheduling policies, and the static scheduling status from a set of dynamic grid scheduling agents. Each of the set of dynamic grid scheduling agents is located in one of the set of nodes. In this embodiment, the resource availability information, the set of static scheduling policies, and the static scheduling status may be received from the set of dynamic grid scheduling agents in response to querying the set of dynamic grid scheduling agents.

In one non-limiting example, the resource availability information, the set of static scheduling policies, and the static scheduling status are received from the set of dynamic grid scheduling agents on a predetermined periodic basis. In another non-limiting example, the resource availability information, the set of static scheduling policies, and the static scheduling status are received from the set of dynamic grid scheduling agents in response to resources becoming available on at least one of the set of nodes.

In another embodiment, the process creates the dynamic grid scheduling policy using a set of job attributes required by the set of grid jobs. Also, the set of static scheduling policies may be a set of user-definable static scheduling policies.

In another embodiment, the set of grid jobs do not require parallel processing. The process may also provide the resource availability information, the set of static scheduling policies, and the static scheduling status to another dynamic grid scheduler.

In one embodiment, the dynamic grid scheduling policy is an optimal allocation of the available resources to the set of grid jobs. In another embodiment, the grid computing system is a heterogeneous grid computing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 12 is a block diagram of job attributes in a system for scheduling grid jobs in accordance with an illustrative embodiment;

FIG. 13 is a block diagram of resource availability information in a system for scheduling grid jobs in accordance with an illustrative embodiment;

FIG. 14 is a block diagram of a static scheduler status in a system for scheduling grid jobs in accordance with an illustrative embodiment;

FIG. 16 is a flowchart illustrating a process for scheduling grid jobs in accordance with an illustrative embodiment.

DETAILED DESCRIPTION OF THE PREFERRED EMBODIMENT

Figure 1:
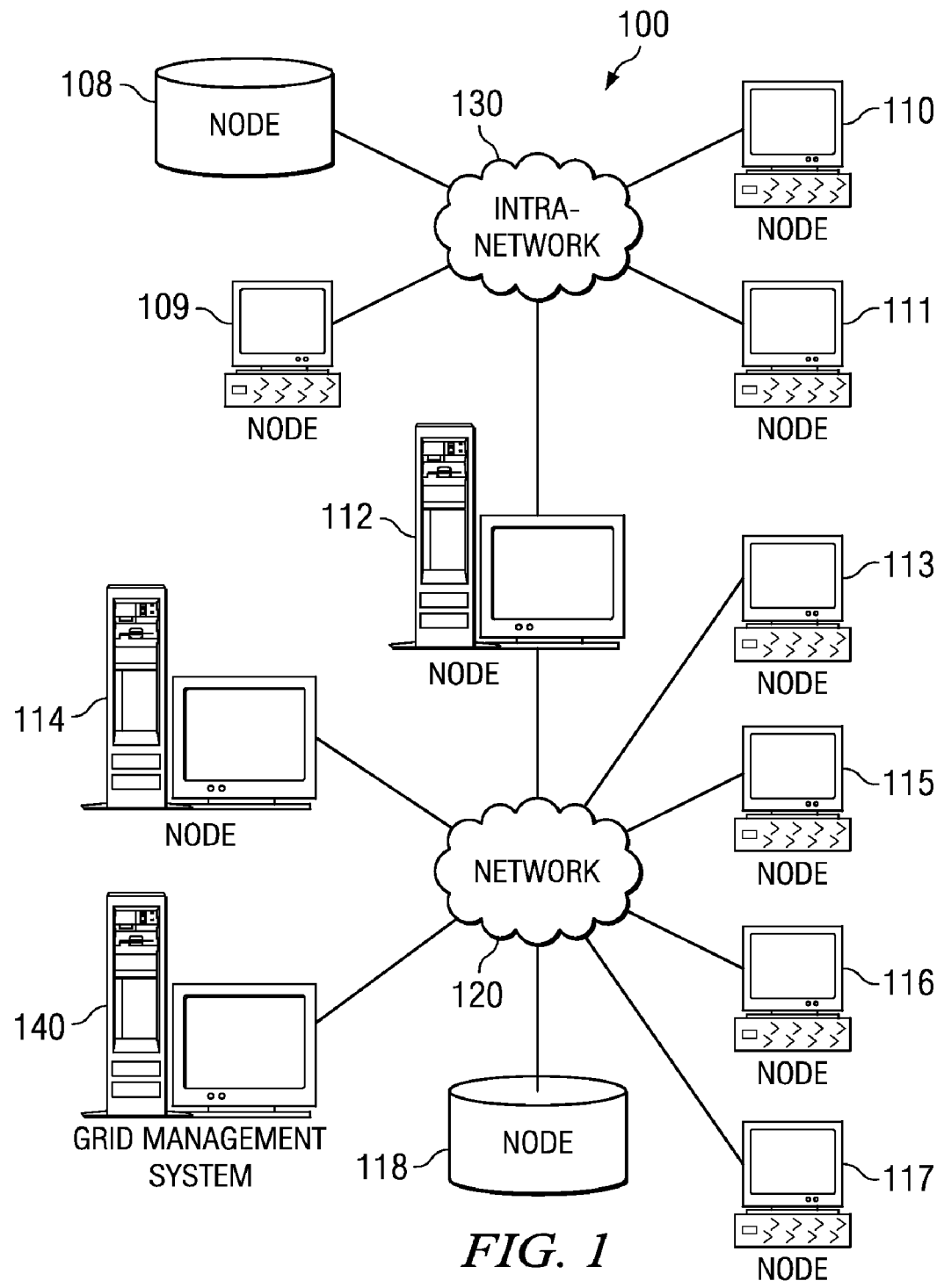
FIG. 1 is an exemplary diagram of a computing grid environment in which the illustrative embodiments may be implemented.

FIG. 1 is an exemplary diagram of a computing grid environment in which aspects of the present invention may be implemented. As shown in FIG. 1, computing grid 100 includes nodes 108-118 coupled together via one or more networks 120-130. The nodes may be any type of computing device that is capable of either processing grid jobs and grid data or is capable of providing such grid data to other grid nodes. For example, one of nodes 108-118 may be a server computing device, client computing device, workstation, blade, personal computer, database system, mainframe computer system, or the like.

Computing grid 100 is managed by the grid management system 140. Grid management system 140 communicates with nodes 108-118 to obtain information about each of the nodes in nodes 108-118 and to submit grid jobs and grid data to nodes 108-118 for processing. Grid management system 140 provides the necessary functionality for determining which nodes in nodes 108-118 in the computing grid 100 are online, which nodes in nodes 108-118 have available capacity to handle grid jobs, schedules the dispatching of grid jobs to the various node in nodes 108-118, receives and correlates the results of the grid jobs dispatched to nodes 108-118, and performs other grid management functions in accordance with the embodiments of the present invention described hereafter.

In these examples, a grid project is the highest level of a piece of work on the grid. A grid project may also sometimes be equivalently referred to by the term "grid application." A grid job may be a portion of work required to perform a grid project. That is, a grid project is broken up into a plurality of individual grid jobs that may be dispatched to grid nodes for processing. A set of grid jobs performing a grid project may execute in parallel on different nodes in the grid. Parallel grid jobs run at approximately the same time as one another and depend on one another to successfully complete the grid project to which the parallel grid jobs belong. A grid job may also sometimes be referred to in the art as a transaction, work unit, task, or submission.

Any combination of nodes in nodes 108-118 may be grouped together such that the group of nodes in nodes 108-118 are managed by a static scheduler. For example, nodes 108, 109, 110, and 111 may be managed by the same static scheduler.

Each node in nodes 108-118 in computing grid 100 may perform non-grid related processing, and may also perform processing of grid jobs submitted to them from the grid management system 140. The results of the processing of these grid jobs are then returned to the grid management system 140 or other designated node, which combines the results of various grid jobs in order to obtain the necessary data for completion of the grid project. Grid agent software present on nodes 108-118 may also measure performance characteristics of nodes 108-118 and provide these measurements to the grid management system 140 so that the grid management system 140 can properly schedule dispatching of grid jobs to the various nodes 108-118.

Figure 2:
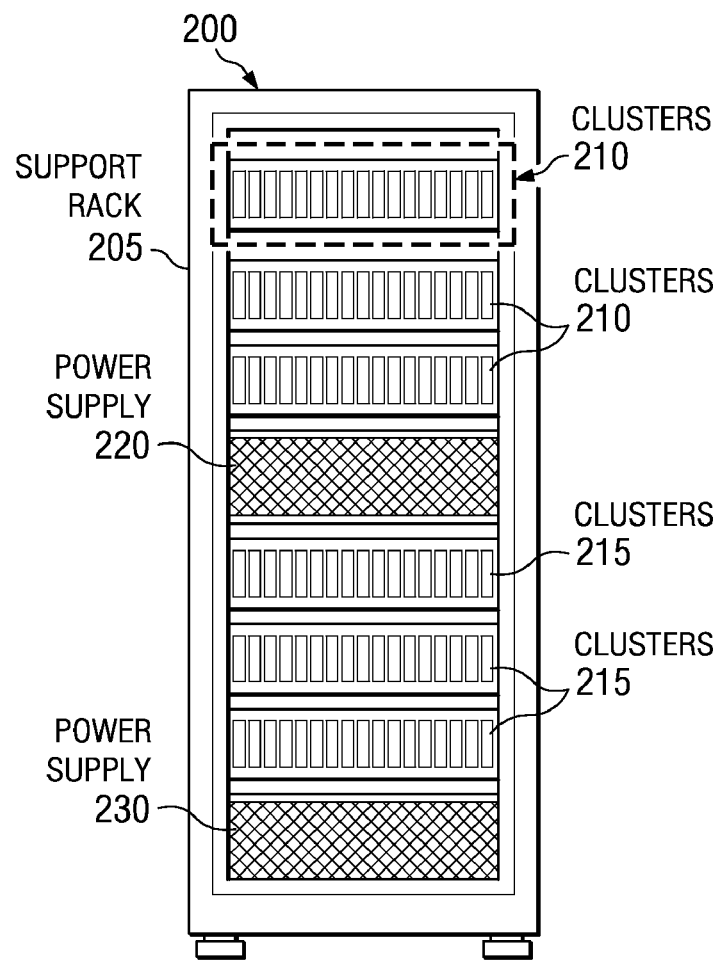
FIG. 2 is a pictorial representation of a grid computing environment in which the illustrative embodiments may be implemented.

Turning now to FIG. 2, a pictorial representation of a grid computing environment is depicted in which the illustrative embodiments may be implemented. Specifically, FIG. 2 shows data processing system 200 having multiple computing devices. In one embodiment, data processing system 200 may be a node, such as any one of nodes 108-118 in FIG. 1, or may contain a grid management system, such as grid management system 140 in FIG. 1.

The contents of data processing system 200 are contained by support rack 205. Support rack 205 may be any structure that can support multiple computing devices. The computing devices contained by support rack 205 are vertically aligned with one another.

Support rack 205 contains two sets of clusters. Specifically, support rack 205 contains a first set of clusters 210 and a second set of clusters 215. The content of clusters 210 and 215 are discussed in greater detail with respect to FIG. 3 below.

The resources of one or more of clusters 210 and 215 may be managed by a static scheduler. For example, a first static scheduler may manage the resources of clusters 210 while a second static scheduler manages the resources of clusters 215.

Power supplies 220 and 230 provide power to clusters 210 and 215, respectively. In addition to providing power through power supplies 220 and 230, additional devices may be contained by support rack 205 to provide services to the computing devices of data processing system 200, such as cooling, networking, and intra-connections between components.

Figure 3:
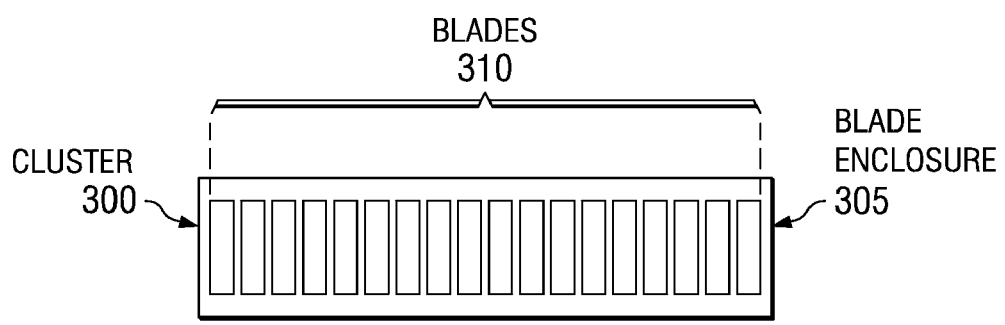
FIG. 3 is a pictorial representation of a portion of a grid computing environment in which the illustrative embodiments may be implemented.

Turning now to FIG. 3, a pictorial representation of a portion of a grid computing environment is depicted in which the illustrative embodiments may be implemented. Specifically, FIG. 3 shows cluster 300. Cluster 300 is a non-limiting example of clusters 210 and 215 in FIG. 2. As depicted, cluster 300 includes blade enclosure 305 and blades 310.

Blades 310 are mounted into blade enclosure 305. Each of blades 310 is an example of a node, such as any one of nodes 108-110 in FIG. 1. A blade is a computing device having a unique spatial configuration, such as the configuration shown in FIG. 3. FIG. 3 shows blades 310 mounted into blade enclosure 305. In these examples, blades 310 contains eighteen blades. While a blade includes the essential components of a computer, such as a memory to read input commands and data, a processor, and storage, certain components of a blade may be removed for space, power, and other considerations.

For example, the space saved by removing some components of a blade allows the blades to be densely packed together in clusters, as in cluster 300.

Cluster 300 is made more efficient by providing central services for each of blades 310. By centralizing services for each of blades 310, those same services do not have to be provided locally by the hardware of each of blades 310, thereby saving space and individual power consumption. Examples of services that may be offered centrally within blade enclosure 305 include power, cooling, networking, and centralized storage. Also, centralized services may be offered by one of blades 310. For example, one of blades 310 may contain a centralized storage for use by all of blades 310.

Blades 310 may each be connected to a high speed backplane that facilitates rapid transfer of data between blades 310. Typically, one of blades 310 would be designated as a head node and act as the controller to peripheral devices, such as a CD-ROM, DVD, magnetic tape, or hard disk drive device. Other blades 310 within blade enclosure 305 may be classified as compute nodes and run compute intensive applications that interact with file systems managed by the head node or a designated Input/Output node. Data transfer between blades 310 within blade enclosure 305 can occur at a higher rate than traffic between network-connected nodes or network-connected blades.

The resources contained by blades 310 of cluster 300 may be managed by one or more static schedulers. Each of blades 310 may act as a node whose resources are allocated to grid jobs that are submitted to the static scheduler managing the nodes.

Different models of blades, such as blades 310, are offered by several manufacturers. Examples of blade models include the HS20 blade server from International Business Machines® (IBM), and the ProLiant server blade, made by Hewlett Packard®.

Figure 4:
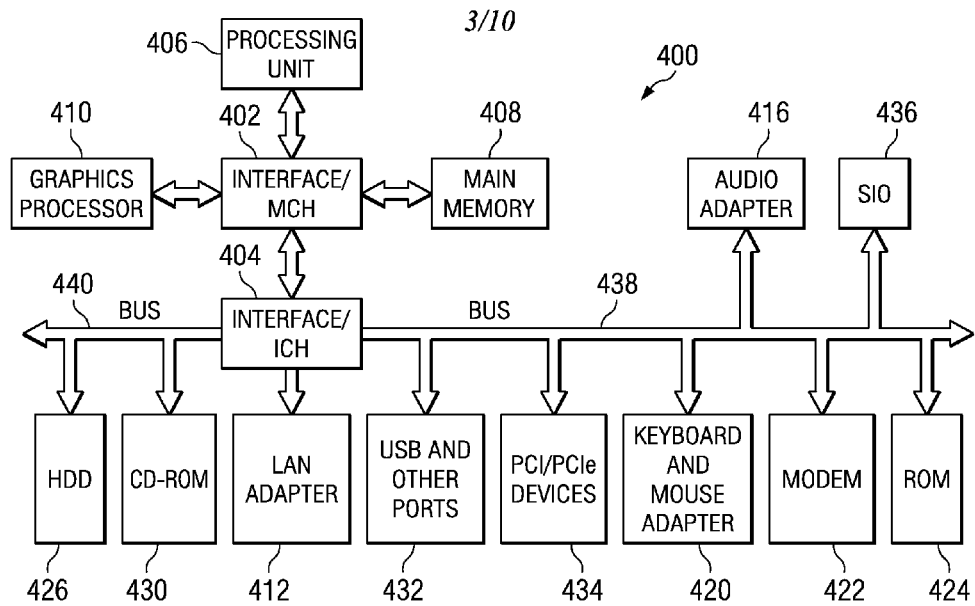
FIG. 4 is a block diagram of a data processing system in which the illustrative embodiments may be implemented.

With reference now to FIG. 4, a block diagram of a data processing system is shown in which illustrative embodiments may be implemented. Data processing system 400 is an example of a computer, such as any one of nodes 108-118 or grid management system 140 in FIG. 1, or one of blades 310 in FIG. 3, in which computer-usable program code or instructions implementing the processes may be located for the illustrative embodiments. Data processing system 400 is capable of executing grid jobs, such as computing grid 100 in FIG. 1 or data processing system 200 in FIG. 2.

In the depicted example, data processing system 400 employs a hub architecture including interface and memory controller hub (interface/MCH) 402 and interface and input/output (I/O) controller hub (interface/ICH) 404. Processing unit 406, main memory 408, and graphics processor 410 are coupled to interface and memory controller hub 402. Processing unit 406 may contain one or more processors and even may be implemented using one or more heterogeneous processor systems. Graphics processor 410 may be coupled to the interface/MCH through an accelerated graphics port (AGP), for example.

In the depicted example, local area network (LAN) adapter 412 is coupled to interface and I/O controller hub 404 and audio adapter 416, keyboard and mouse adapter 420, modem 422, read only memory (ROM) 424, universal serial bus (USB) and other ports 432, and PCI/PCIe devices 434 are coupled to interface and I/O controller hub 404 through bus 438, and hard disk drive (HDD) 426 and CD-ROM 430 are coupled to interface and I/O controller hub 404 through bus 440. PCI/PCIe devices may include, for example, Ethernet adapters, add-in cards, and PC cards for notebook computers. PCI uses a card bus controller, while PCIe does not. Read only memory 424 may be, for example, a flash binary input/output system (BIOS). Hard disk drive 426 and CD-ROM 430 may use, for example, an integrated drive electronics (IDE) or serial advanced technology attachment (SATA) interface. A super I/O (SIO) device 436 may be coupled to interface and I/O controller hub 404.

An operating system runs on processing unit 406 and coordinates and provides control of various components within data processing system 400 in FIG. 4. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 400. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 426, and may be loaded into main memory 408 for execution by processing unit 406. The processes of the illustrative embodiments may be performed by processing unit 406 using computer implemented instructions, which may be located in a memory such as, for example, main memory 408, read only memory 424, or in one or more peripheral devices.

The hardware in FIGS. 1-4 may vary depending on the implementation. In the example in which data processing system 400 is a blade, such as one of blades 310 in FIG. 3, some components of the data processing system 400 may be removed to save space and increase efficiency. For example, graphics processor 410, audio adapter 416, keyboard and mouse adapter 420, and CD-ROM 430 may be removed when data processing system 400 is implemented as a blade. Other internal hardware or peripheral devices, such as flash memory, equivalent non-volatile memory, or optical disk drives and the like, may be used in addition to or in place of the hardware depicted in FIGS. 1-4. Also, the processes of the illustrative embodiments may be applied to a multiprocessor data processing system.

In some illustrative examples, data processing system 400 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 408 or a cache such as found in interface and memory controller hub 402. A processing unit may include one or more processors or CPU's. The depicted examples in FIGS. 1-4 and above-described examples are not meant to imply architectural limitations.

The illustrative embodiments described herein provide a computer-implemented method, apparatus, and computer program product for scheduling grid jobs. In one embodiment, a process identifies information describing available resources on a set of nodes to form resource availability information. A set of nodes is one or more computing devices that contain resources. A grid computing system includes at least two interconnected computing devices. A grid job is any job capable of being utilized on a grid computing system, such as computing grid 100 in FIG. 1 or data processing system 200 in FIG. 2.

The process identifies a set of static scheduling policies for a set of static schedulers that manage the set of nodes. The set of static scheduling policies is one or more static scheduling policies used to determine how grid jobs are scheduled and utilized on a static scheduler.

The process also identifies a static scheduling status for a portion of the set of static schedulers. A portion of the set of static schedulers may be any number of static schedulers in the set of static schedulers. The static scheduling status is data that indicates the current state of a static scheduler. For example, the static scheduling status may describe the grid jobs that are queued in a static scheduler's job queue.

The process creates a dynamic grid scheduling policy using the resource availability information, the set of static scheduling policies, and the static scheduling status. The process also schedules a set of grid jobs for execution by the available resources using the dynamic grid scheduling policy. The set of grid jobs is one or more grid jobs.

In another embodiment, the process receives the resource availability information, the set of static scheduling policies, and the scheduling status from a set of informational providers. In this embodiment, the resource availability information, the set of static scheduling policies, and the static scheduling status may be received from the set of informational providers in response to querying the set of informational providers.

In an alternate embodiment, the process receives the resource availability information, the set of static scheduling policies, and the static scheduling status from a set of dynamic grid scheduling agents. Each of the set of dynamic grid scheduling agents is located in one of the set of nodes. In this embodiment, the resource availability information, the set of static scheduling policies, and the static scheduling status may be received from the set of dynamic grid scheduling agents in response to querying the set of dynamic grid scheduling agents.

In another embodiment, the dynamic grid scheduling policy is an optimal allocation of the available resources to the set of grid jobs. The set of job attributes describes one or more properties of one or more grid jobs. The optimal allocation of available resources is the most efficient utilization of available resources for the execution of the set of grid jobs given the resource availability information, the set of static scheduling policies, and the static scheduling status.

Figure 5:
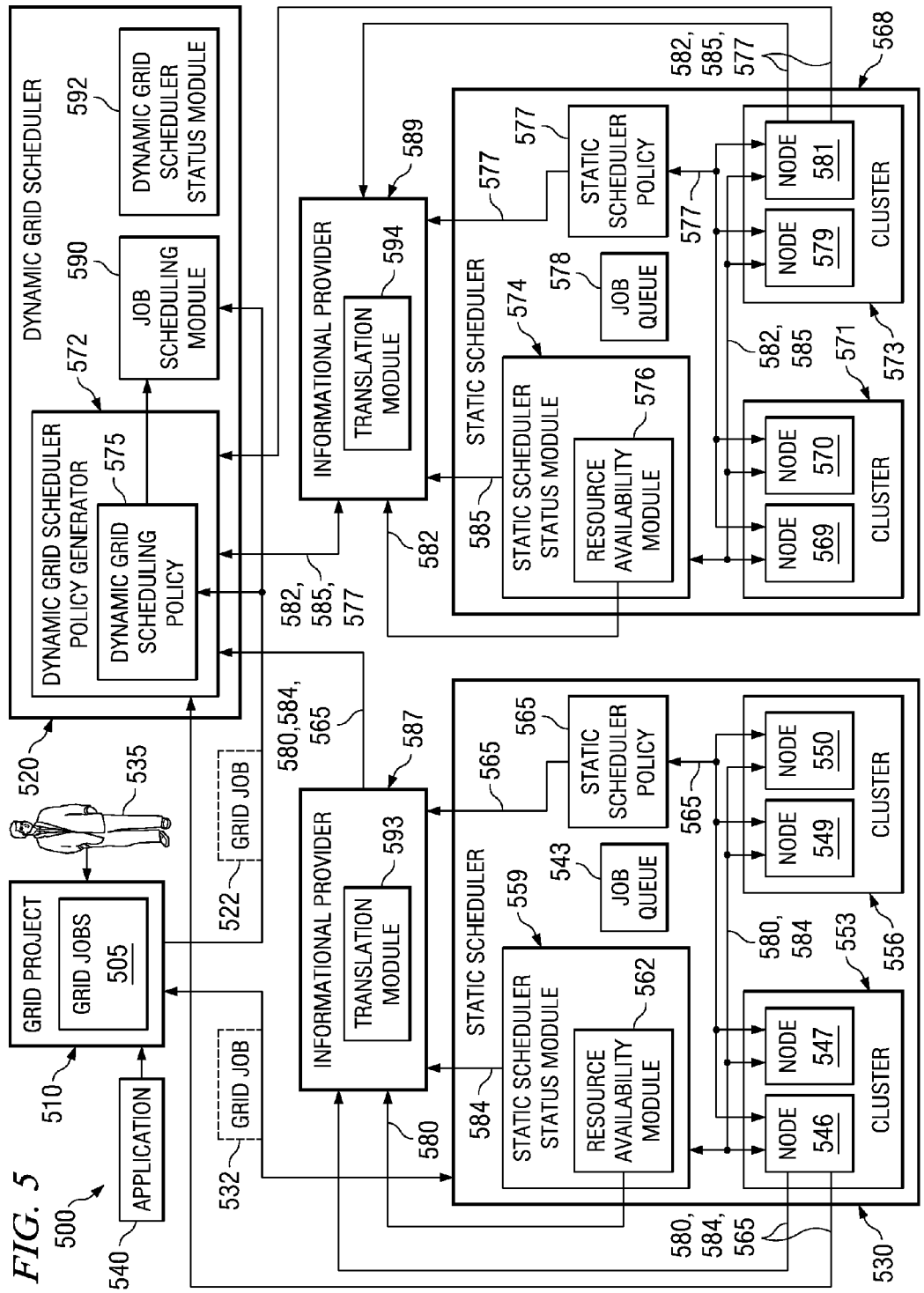
FIG. 5 is a block diagram of a system for scheduling grid jobs in accordance with an illustrative embodiment.

Turning now to FIG. 5, a block diagram of a system for scheduling grid jobs is depicted in accordance with an illustrative embodiment. Data processing system 500 shown in FIG. 5 may be implemented on a computing grid, such as computing grid 100 in FIG. 1 or data processing system 200 in FIG. 2. The different blocks shown in FIG. 5 illustrate processes, data structures, and hardware used to process jobs.

As depicted, data processing system 500 schedules grid jobs 505. Grid jobs 505 are any jobs capable of being utilized on a grid computing system, such as computing grid 100 in FIG. 1 or data processing system 200 in FIG. 2. In addition to the examples provided above, other non-limiting examples of grid jobs include executable files or scripts capable of being utilized on a grid computing system.

Grid jobs 505 are included in grid project 510. Grid project may include any number of grid jobs 505. One non-limiting example of a grid project includes a sampling project in which multiple inputs are substituted for variables in the same formula to provide a sampling that is based on the formula. Another non-limiting example of a grid project is an application that constructs an image out of multiple sub-images. The subject matter that may potentially be covered by grid projects spans the entire spectrum of human endeavor.

Grid jobs 505 are sent to dynamic grid scheduler 520 and static scheduler 530. Grid jobs 505 may be sent to dynamic grid scheduler 520 and static scheduler 530 by user 535 or application 540. User 535 may be any person capable of sending a grid job to dynamic grid scheduler 520 or static scheduler 530. In one non-limiting example, user 535 is an administrator of a grid computing system.

Application 540 may be any application that is capable of sending grid jobs. For example, application 540 may contain multiple grid projects, such as grid project 510, each containing grid jobs, such as grid jobs 505. Application 540 may also be a login shell, an operating system, a command, an executable, a process, a daemon, or any other component of data processing system 500 that sends grid jobs.

Although application 540 is shown in FIG. 5 as part of data processing system 500, application 540 may be located on a remote computing device at a remote location, such as one of nodes 108-118 in FIG. 1. Application 540 may send grid jobs through a network, such as networks 120 or 130 in FIG. 1. Also, although application 540 is shown as separate from grid project 510, application 540 may itself be a grid project containing grid jobs.

Grid job 532 is sent to static scheduler 530. Upon reaching static scheduler 530, grid job 532 is placed into job queue 543. Job queue 543 contains grid jobs, such as grid job 532, which have yet to be executed by nodes 546, 547, 549, and 550.

Although FIG. 5 depicts a single job queue, job queue 543, in static scheduler 530, more than one job queue may also be present in static scheduler 530. In one embodiment, static scheduler 530 may contain multiple job queues, each of which is assigned to a similar set of resources. Grouping similar resources to a job queue may be required for submitting parallel jobs that communicate with each other via a message passing interface (MPI) because such jobs must rendezvous at a barrier with an application before being processed. In this embodiment, each job queue may be assigned to one of clusters 553 and 556. One convention is to name the job queue with the owning department followed by the speed of the nodes associated with the job queue. An example of a job queue name is TD3060, which indicates the owning department "Technology Development" and a node processor speed of 3.06 MegaHertz.

Static scheduler 530 contains clusters 553 and 556. A cluster contains one or more nodes. Cluster 300 in FIG. 3 is a non-limiting example of clusters 553 and 556. Although FIG. 5 shows static scheduler 530 as containing two clusters 553 and 556, static scheduler 530 may contain any number of clusters. Nodes 546, 547, 549, and 550 may be grouped into clusters 553 and 556 for a variety of reasons. For example, each cluster may correspond to a single job queue and execute only cluster jobs in the corresponding job queue.

As another example, clusters 553 and 556 may each contain a set of nodes that are grouped with one or more input/output (I/O) nodes. I/O nodes manage data transfer to a file system that is shared by the set of nodes in the cluster. The ratio of nodes to I/O nodes may vary depending on the type of jobs that are submitted to the nodes or the physical characteristics of the nodes. An example of a physical characteristic is the packaging configuration of blade servers within a blade enclosure, such as a blade center chassis.

Nodes 546, 547, 549, and 550 contain resources that are used to execute grid job 532 and any grid jobs in job queue 543. A resource is any hardware or software component of a computing device that may used to perform a grid job. Examples of a node in nodes 546, 547, 549, and 550 include any one of nodes 108-118 in FIG. 1 and a blade in blades 310 in FIG. 3. The components of nodes 546, 547, 549, and 550 are discussed in greater detail with respect to FIG. 6 below.

Static scheduler 530 includes static scheduler status module 559. Static scheduler status module 559 contains the static scheduler status 584 of static scheduler 530. Static scheduler status 584 is data that indicates the current state of static scheduler 530, such as attributes describing the components and workload of static scheduler 530. These attributes may be defined by static scheduler 530, dynamic grid scheduler 520, or user 535. For example, static scheduler status 584 may describe the quantity of grid jobs that are queued in job queue 543, as well as job attributes associated with those grid jobs. Static scheduler status 584 may be expressed using any computer language and any combination of logical expressions. The information indicated by static scheduler status 584 is described in further detail with respect to FIG. 13 below.

Static scheduler status module 559 contains resource availability module 562. Resource availability module 562 contains resource availability information 580. Resource availability information 580 describes the available resources that are contained on nodes 546, 547, 549, and 550. For example, resource availability information 580 may describe whether resources are available on nodes 546, 547, 549, and 550. In this example, resource availability information 580 may also contain technical statistics describing the available resources on nodes 546, 547, 549, and 550. For example, resource availability information 580 may indicate the model, architecture, and operating system of each of nodes 546, 547, 549, and 550, as well as the available virtual memory, disk space, CPU's, and memory contained on nodes 546, 547, 549, and 550.

In one embodiment, resource availability information 580 may also be expressed by a set of user-defined expressions. For example, the expression 'busy' or 'dedicated' may be used to indicate that a particular node does not have available resources. The expression 'free' or 'non-dedicated' may be used to indicate that a particular node has available resources. Expressions may also be used to indicate that particular resources in a node are free, such as "memory free" or "CPU free." In one embodiment, resource availability module 562 contains one or more expressions for each of nodes 546, 547, 549, and 550. These user-defined expressions may be used by dynamic grid scheduler 520 to simplify processing of resource availability information 580. The information indicated by resource availability information 580 is described in further detail with respect to FIG. 12 below.

Static scheduler 530 also contains static scheduler policy 565. Static scheduler policy 565 determines how grid jobs are scheduled and executed on static scheduler 530. For example, static scheduler policy 565 may determine the order in which grid jobs are executed from job queue 543. Static scheduler policy 565 may be defined or programmed by a user, such as user 535.

In addition, static scheduler policy 565 may define a policy to be enforced by dynamic grid scheduler 520. Dynamic grid scheduler 520 takes static scheduler policy 565 into consideration when scheduling grid jobs to be executed on nodes 546, 547, 549, and 550.

Data processing system 500 also contains static scheduler 568. Like static scheduler 530, static scheduler 568 contains resources that may reside on one or more nodes managed by static scheduler 568. Specifically, static scheduler 568 includes nodes 569, 570, 579 and 581, each of which contains resources. Although static scheduler 568 is shown to have four nodes 569, 570, 579 and 581, static scheduler 568 may contain any number of nodes. Nodes 569 and 570 belong to cluster 571 and nodes 579 and 581 belong to cluster 573. Static scheduler 568 may contain any number of clusters.

Static scheduler 568 also contains static scheduler status module 574, resource availability module 576, and static scheduler policy 577. However, static scheduler status 585, resource availability information 582, and static scheduler policy 577 may differ from static scheduler status 584, resource availability information 580, and static scheduler policy 565 of static scheduler 530.

Alternatively, static scheduler status 585 and resource availability information 582 may be included in static scheduler 568 without the need for static scheduler status module 574 and resource availability module 576. Static scheduler 568 also includes job queue 578. Static scheduler 568 may use different types, models, and versions of hardware and software than static scheduler 530.

Thus, a heterogeneous environment exists in which multiple static schedulers with different properties have resources that are jointly managed by dynamic grid scheduler 520. Although FIG. 5 shows two static schedulers 530 and 568, any number of static schedulers, such as 5, 18, or 120, may be associated with one another such that their resources are managed by dynamic grid scheduler 520.

Grid job 522 is sent to dynamic grid scheduler 520. Dynamic grid scheduler 520 includes dynamic grid scheduler policy generator 572. Dynamic grid scheduler policy generator 572 generates dynamic grid scheduling policy 575. Dynamic grid scheduling policy 575 optimally allocates available resources on nodes 546, 547, 549, 550, 569, 570, 579 and 581 to a set of grid jobs 505. The optimal allocation is based on resource availability information 580 and 582 included in resource availability modules 562 and 576, respectfully, static scheduler policies 565 and 577, and static scheduler statuses 584 and 585 for static schedulers 530 and 568 contained in static scheduler status modules 559 and 574, respectfully.

Dynamic grid scheduler policy generator 572 identifies resource availability information 580 and 582, static scheduler policies 565 and 577, and static scheduler statuses 584 and 585 in order to create dynamic grid scheduling policy 575. The illustrative embodiments below show that dynamic grid scheduler policy generator 572 may identify resource availability information 580 and 582, static scheduler policies 565 and 577, and static scheduler statuses 584 and 585 in a variety of ways.

In one embodiment, dynamic grid scheduler policy generator 572 identifies resource availability information 580 and 582, static scheduler policies 565 and 577, and static scheduler statuses 584 and 585 by receiving resource availability information 580 and 582, static scheduler policies 565 and 577, and static scheduler statuses 584 and 585 from a set of informational providers 587 and 589. The set of informational providers 587 and 589 include one or more informational providers.

In FIG. 5, the total number of informational providers 587 and 589 is equal to the total number of static schedulers 530 and 568. Although FIG. 5 shows two informational providers 587 and 589, each corresponding to a respective static scheduler 530 and 568, any number of informational providers may be present in data processing system 500. For example, one informational provider that corresponds to all static schedulers in data processing system 500 may be present. Informational providers 587 and 589 provide a central method of extracting data from multiple static schedulers in a heterogeneous environment.

FIG. 5 shows information providers 587 and 589 as separate components from dynamic grid scheduler 520 and static schedulers 530 and 568. However, informational providers 587 and 589 may also be included as part of either or both of dynamic grid scheduler 520 and static schedulers 530 and 568. In one example, informational providers 587 and 589 are each part of one of nodes 546, 547, 549, 550, 569, 570, 579 and 581.

Informational providers 587 and 589 extract resource availability information 580 and 582, static scheduler policies 565 and 577, and static scheduler statuses 584 and 585 from static schedulers 530 and 568, respectfully. Alternatively, static schedulers 530 and 568 may send or advertise their resource availability information 580 and 582, static scheduler policies 565 and 577, and static scheduler statuses 584 and 585 to informational providers 587 and 589.

In one embodiment, resource availability information 580 and 582 that is sent to informational providers 587 and 589 is provided by resource availability modules 562 and 576. In this embodiment, resource availability information 580 is provided to resource availability module 562 by nodes 546, 547 549 and 550, while resource availability information 582 is provided to resource availability module 576 by nodes 569, 570, 579 and 581.

Informational providers 587 and 589 may provide resource availability information 580 and 582, static scheduler policies 565 and 577, and static scheduler statuses 584 and 585 to dynamic grid scheduler policy generator 572 at any time. In one embodiment, dynamic grid scheduler 520 queries one or both of informational providers 587 and 589. In response to the query from dynamic grid scheduler 520, informational providers 587 and 589 send resource availability information 580 and 582, static scheduler policies 565 and 577, and static scheduler statuses 584 and 585 to dynamic grid scheduler policy generator 572.

In another embodiment, informational providers 587 and 589 send resource availability information 580 and 582, static scheduler policies 565 and 577, and static scheduler statuses 584 and 585 on a predetermined periodic basis, such as one minute, one hour, one day, or one week. In another embodiment, informational providers 587 and 589 send resource availability information 580 and 582, static scheduler policies 565 and 577, and static scheduler statuses 584 and 585 when informational providers 587 and 589 detect any change in resource availability information 580 and 582.

Informational providers 587 and 589 also include translation modules 593 and 594. Translation modules 593 and 594 may translate the format of resource availability information 580 and 582, static scheduler policies 565 and 577, and static scheduler statuses 584 and 585 from one format to another. For example, the format of resource availability information 580, static scheduler policy 565, and static scheduler status 584 may be translated from a local format that is non-recognizable to dynamic grid scheduler 520 to a format that is recognizable by dynamic grid scheduler 520. The format translation implemented by translation modules 593 and 594 may involve translating resource availability information 580 and 582, static scheduler policies 565 and 577, and static scheduler statuses 584 and 585 from one computer language to another.

In another embodiment, dynamic grid scheduler policy generator 572 identifies resource availability information 580 and 582, static scheduler policies 565 and 577, and static scheduler statuses 584 and 585 by receiving resource availability information 580 and 582, static scheduler policies 565 and 577, and static scheduler statuses 584 and 585 from any one of nodes 546, 547, 549, 550, 569, 570, 579 and 581. In particular, FIG. 5 shows nodes 546, 547, 549 and 550 receiving resource availability information 580 and static scheduler status 584 from resource availability module 562 and static scheduler status module 559, respectfully. Nodes 546, 547, 549 and 550 also receive static scheduler policy 565.

Node 546 sends resource availability information 580, static scheduler status 584, and static scheduler policy 565 to informational provider 587 and dynamic grid scheduler 520. Alternatively, node 546 may send resource availability information 580, static scheduler status 584, and static scheduler policy 565 to only one of informational provider 587 and dynamic grid scheduler 520.

Likewise, FIG. 5 shows nodes 569, 570, 579 and 581 receiving resource availability information 582 and static scheduler status 585 from resource availability module 576 and static scheduler status module 574, respectfully. Nodes 569, 570, 579 and 581 also receive static scheduler policy 577.

Node 581 sends resource availability information 582, static scheduler status 585, and static scheduler policy 577 to informational provider 589 and dynamic grid scheduler 520. Alternatively, node 581 may send resource availability information 582, static scheduler status 585, and static scheduler policy 577 to only one of informational provider 589 and dynamic grid scheduler 520.

Nodes 546 and 581 may provide resource availability information 580 and 582, static scheduler policies 565 and 577, and static scheduler statuses 584 and 585 to dynamic grid scheduler policy generator 572 at any time. In one embodiment, dynamic grid scheduler 520 queries either or both of nodes 546 and 581. In response to the query from dynamic grid scheduler 520, nodes 546 and 581 send resource availability information 580 and 582, static scheduler policies 565 and 577, and static scheduler statuses 584 and 585 to dynamic grid scheduler policy generator 572.

In another embodiment, nodes 546 and 581 send resource availability information 580 and 582, static scheduler policies 565 and 577, and static scheduler statuses 584 and 585 on a predetermined periodic basis, such as one minute, one hour, one day, or one week. In another embodiment, nodes 546 and 581 send resource availability information 580 and 582, static scheduler policies 565 and 577, and static scheduler statuses 584 and 585 in response to resources becoming available on one of nodes 546, 547, 549, 550, 569, 570, 579 and 581. For example, node 546 may send resource availability information 580, static scheduler policy 565, and static scheduler status 584 in response to resources on one of nodes 546, 547, 549 and 550 becoming available. In another example, node 546 sends resource availability information 580, static scheduler policy 565, and static scheduler status 584 in response to one of nodes 546, 547, 549 and 550 having a state of 'free.'

In another embodiment, dynamic grid scheduler policy generator 572 identifies resource availability information 580 and 582 by receiving information regarding the availability of resources for only a single node. For example, node 549 may send information indicating whether resources on node 549 are available. In one example, node 549 may indicate whether the node is 'free' or 'busy.' In another example, node 549 sends detailed technical information regarding the status of resources on the first node of nodes 549. An example of this latter type of resource availability information is discussed in further detail with respect to FIG. 12 below.

Any of nodes 546, 547, 549, 550, 569, 570, 579 and 581 may send information regarding the availability of resources on a single node at any time. In one embodiment, dynamic grid scheduler 520 queries one of nodes 546, 547, 549, 550, 569, 570, 579 and 581. For example, dynamic grid scheduler 520 may query node 569. In this example, in response to the query from dynamic grid scheduler 520, node 569 sends resource availability information for node 569 to dynamic grid scheduler policy generator 572.

In another embodiment, node 569 sends resource availability information for node 569 on a predetermined periodic basis, such as one minute, one hour, one day, or one week. In another embodiment, node 569 sends resource availability information in response to resources becoming available on the node 569. In another example, node 569 sends resource availability information for node 569 in response to node 569 having or changing to a state of 'free.'

Grid job 522 has a set of job attributes. The set of job attributes describe one or more properties of one or more grid jobs. For example, the set of job attributes may indicates the resources required for the execution of grid job 522. The information indicated by the set of job attributes is discussed in further detail with respect to FIG. 11 below.

As discussed above, dynamic grid scheduler policy generator 572 creates dynamic grid scheduling policy 575 using resource availability information 580 and 582, static scheduler policies 565 and 577, and static scheduler statuses 584 and 585. In another embodiment, dynamic grid scheduler policy generator 572 creates the dynamic grid scheduling policy 575 using a set of job attributes required by the set of grid jobs 505. Thus, dynamic grid scheduling policy 575 may also take account of the set of job attributes of grid jobs 505.

Dynamic grid scheduling policy 575 may be expressed in a variety of ways using resource availability information 580 and 582, static scheduler policies 565 and 577, and static scheduler statuses 584 and 585. A user or administrator, such as user 535, may indicate the weight given to resource availability information 580 and 582, static scheduler policies 565 and 577, and static scheduler statuses 584 and 585, as well as the format in which dynamic grid scheduling policy 575 is expressed.

Several examples are given below of dynamic scheduling policies that direct the scheduling of grid jobs on nodes 546, 547, 549, and 550 of static scheduler 530. However, the following examples also illustrate dynamic scheduling policies that may be used to direct the scheduling of grid jobs on nodes 569, 570, 579 and 581 of static scheduler 568, or on all of nodes 546, 547, 549, 550, 569, 570, 579 and 581 on static schedulers 530 and 568.

In one example, dynamic grid scheduling policy 575 may indicate that job scheduling module 590 should only schedule a grid job to available resources on nodes 546, 547, 549, and 550 if static scheduler 530 has no high priority grid jobs queued in job queue 543. In another example, dynamic grid scheduler policy 575 indicates that a grid job should be scheduled to available resources on nodes 546, 547, 549, and 550 only if less than two medium priority grid jobs are queued in job queue 543. In another example, dynamic grid scheduling policy 575 indicates that a grid job should be scheduled to available resources on nodes 546, 547, 549, and 550 only if no grid jobs in job queue 543 have been queued for longer than 24 hours.

In addition to these examples, dynamic grid scheduling policy 575 may define a policy by making reference to any parameter described in resource availability information 580 and 582, static scheduler policies 565 and 577, and static scheduler statuses 584 and 585. These parameters will be discussed in greater detail with respect to FIGS. 12 and 13. Dynamic grid scheduling policy 575 may also make reference to any job attribute of a grid job associated with static scheduler 530, such as grid jobs queued in job queue 543. Job attributes associated with grid jobs will be discussed in greater detail with respect to FIG. 11.

Dynamic grid scheduling policy 575 may also be expressed using logical expressions, which may be defined by user 535 or an application, such as application 540. These logical expressions allow several conditions to be included in dynamic grid scheduling policy 575. For example, two of the dynamic grid scheduling policy examples given above may be combined into the following logical expression:

((no high priority jobs queued) AND (less than two medium priority jobs queued))

The above dynamic grid scheduling policy 575 example defines a policy in which grid jobs should be scheduled to available resources on nodes 546, 547, 549, and 550 only if no high priority grid jobs are queued in job queue 543 of static scheduler 530, and less than two medium priority grid jobs are queued in job queue 543. Dynamic grid scheduling policy 575, such as the dynamic grid scheduling policy given in this example, directs how dynamic grid scheduler 520 schedules jobs on shared resources, wherein shared resources includes any of nodes 546, 547, 549, and 550 that are available to run jobs submitted by static scheduler 530 or dynamic grid scheduler 520.

In another example of dynamic grid scheduling policy 575 expressed using a logical expression, explicit reference is made to the state of resources on nodes 546, 547, 549, and 550:

((Node=='free') && (Queued jobs==0))

The above dynamic grid scheduling policy 575 example defines a policy in which grid jobs should be scheduled to one of nodes 546, 547, 549, and 550 only if the node has a state of 'free' and if no jobs are queued in job queue 543. Dynamic grid scheduling policy 575 and the logical expressions used to express dynamic grid scheduling policy 575 may be encoded using any computer language, or using any combination of logical expressions. The computer language may be understood only locally by dynamic grid scheduler 520 or universally recognized by other schedulers. Dynamic grid scheduler 520 also contains job scheduling module 590. Job scheduling module 590 allocates the available resources managed by static schedulers 530 and 568 to grid job 522 based on dynamic scheduling policy 575, thereby utilizing resources that would have remained idle otherwise.

Dynamic grid scheduler 520 also contains dynamic grid scheduler status module 592. Dynamic grid scheduler status module 592 may send resource availability information 580 and 582, static scheduler policies 565 and 577, and static scheduler statuses 584 and 585 to another dynamic grid schedule other than dynamic grid scheduler 520. Dynamic grid scheduler status module 592 may also send any information regarding dynamic grid scheduler 520, such as dynamic grid scheduling policy 575, to another dynamic grid scheduler. The relationship between dynamic grid scheduler 520 and other dynamic grid schedulers is discussed in greater detail with respect to FIG. 14 below.

Figure 6:
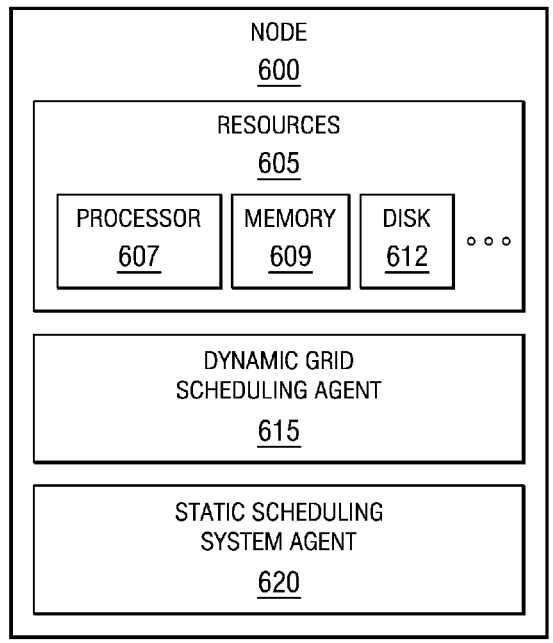
FIG. 6 is a diagram of a node in a system for scheduling grid jobs in accordance with an illustrative embodiment.

Turning now to FIG. 6, a diagram of a node in a system for scheduling grid jobs is depicted in accordance with an illustrative embodiment. Specifically, FIG. 6 shows node 600, which is an example of any of nodes 546, 547, 549, 550, 569, 570, 579 and 581 in FIG. 5.

Node 600 contains resources 605. Resources 605 includes any hardware and/or software components of node 600 that may be utilized to execute a grid job, such as one of grid jobs 505 in FIG. 5. Resources 605 include processor 607, memory 609, and disk 612. Examples of processor 607, memory 609, and disk 612 are processing unit 406, main memory 408, and hard disk drive 426 in FIG. 4, respectively. Resources 605 include details about the components of node 600, such as the computing device model, architecture type, and operating system.

In these examples, node 600 also contains dynamic grid scheduling agent 615. Dynamic grid scheduling agent 615 is an agent located on node 600 that sends and receives information to and from a dynamic grid scheduler, such as dynamic grid scheduler 520 in FIG. 5. Dynamic grid scheduling agent 615 may provide resource availability information, such as resource availability information 580 and 582 in FIG. 5, static scheduling policies, such as static scheduler policies 565 and 577 in FIG. 5, and the static scheduling statuses, such as static scheduler statuses 584 and 585 in FIG. 5, to a dynamic grid scheduler policy generator, such as dynamic grid scheduler policy generator 572 in FIG. 5.

Dynamic grid scheduling agent 615 may also provide resource availability information, a static scheduling policy, and a static scheduling status to an informational provider, such as informational providers 587 and 589 in FIG. 5. In addition, dynamic grid scheduling agent 615 may receive resource availability information, a set of static scheduling policies, and a static scheduling status from one or more static schedulers, such as static schedulers 530 and 568 in FIG. 5.

Dynamic grid scheduling agent 615 may determine whether available resources exist in resources 605. Based on the type and amount of available resources in resources 605, dynamic grid scheduling agent 615 may then make a determination as to whether node 600 is 'free' or 'busy' to handle a grid job.

Dynamic grid scheduling agent 615 may provide resource availability information, a set of static scheduling policies, and a set of static scheduling statuses to a dynamic grid scheduler policy generator or informational provider at any time. In one embodiment, a dynamic grid scheduler queries dynamic grid scheduling agent 615. In response to the query from a dynamic grid scheduler, dynamic grid scheduling agent 615 sends resource availability information, a set of static scheduling policies, and a set of static scheduling statuses to a dynamic grid scheduler policy generator.

In another embodiment, dynamic grid scheduling agent 615 sends resource availability information, a set of static scheduling policies, and a set of static scheduling statuses on a predetermined periodic basis, such as one minute, one hour, one day, or one week. In another embodiment, dynamic grid scheduling agent 615 sends resource availability information, a set of static scheduling policies, and a set of static scheduling statuses in response to one or more of resources 605 becoming available. In another example, dynamic grid scheduling agent 615 sends resource availability information, a set of static scheduling policies, and a set of static scheduling statuses in response to node 600 having or changing to a state of 'free.'

Node 600 also contains static scheduling system agent 620. Static scheduling system agent 620 receives grid jobs from a static scheduler, such as static schedulers 530 and 568 of FIG. 5. The grid jobs received by static scheduling system agent 620 are then performed by resources 605.

Figure 7:
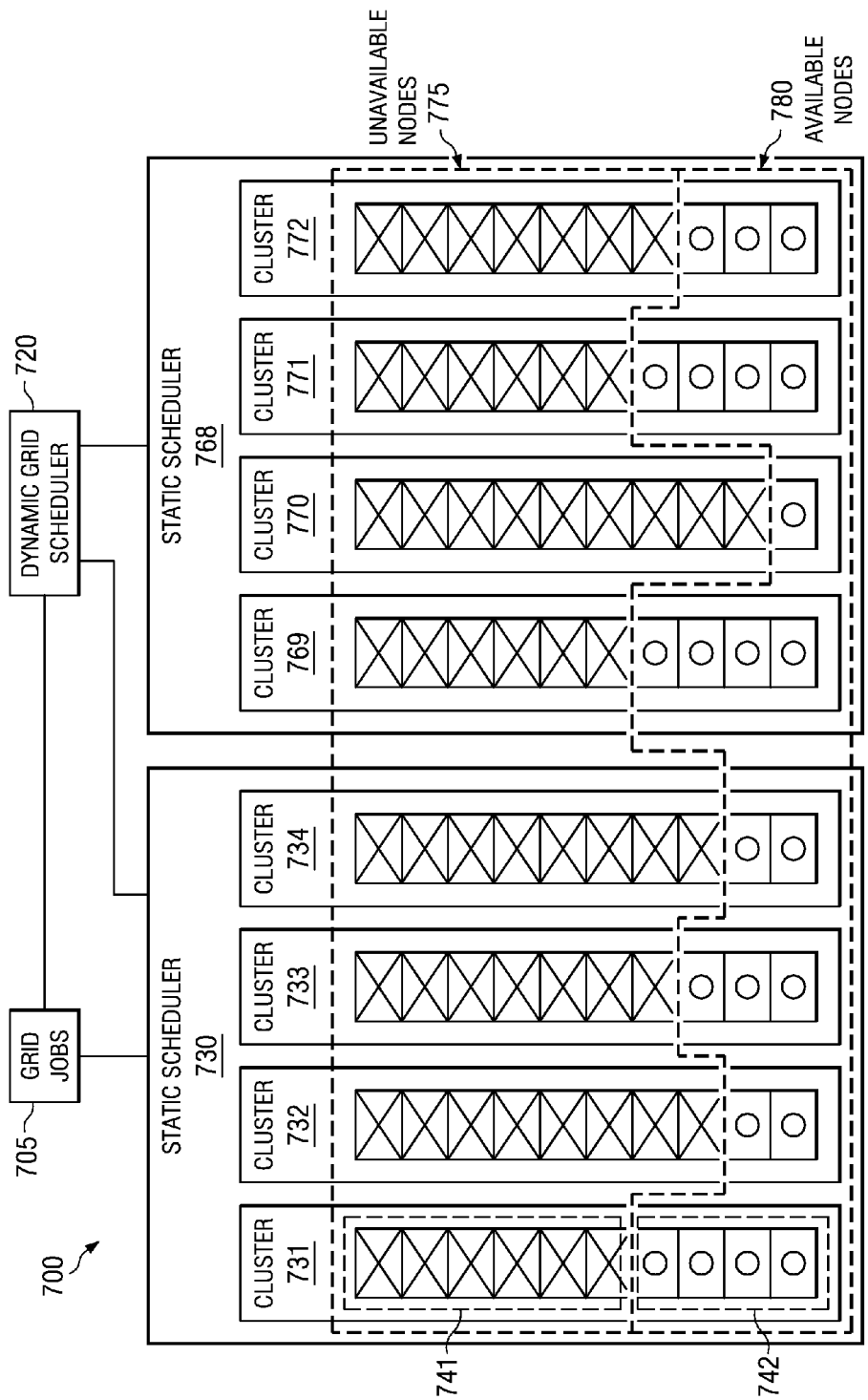
FIG. 7 is a block diagram of a system for scheduling grid jobs in accordance with an illustrative embodiment.

Turning now to FIG. 7, a block diagram of a system for scheduling grid jobs is depicted in accordance with an illustrative embodiment. Specifically, FIG. 7 shows data processing system 700, which has similar components to data processing system 500 in FIG. 5.

Data processing system 700 includes dynamic grid scheduler 720. Dynamic grid scheduler 720 is an example of dynamic grid scheduler 520 in FIG. 5.

Dynamic grid scheduler 720 overlaps the resource management functions of static schedulers 730 and 768. Static schedulers 730 and 768 each contain four clusters. Specifically, static scheduler 730 contains clusters 731, 732, 733, and 734. Static scheduler 768 contains clusters 769, 770, 771, and 772. In this examples, clusters 731, 732, 733, 734, 769, 770, 771, and 772 each contain ten nodes. Although static schedulers 730 and 768 are each shown as having four clusters with ten nodes, static schedulers 730 and 768 may contain any number of clusters and nodes.

In one embodiment, parallel jobs are submitted to static schedulers 730 and 768. The parallel jobs may interface with one another using a Message Passing Interface (MPI). Each cluster 731, 732, 733, 734, 769, 770, 771, and 772 has an associated queue into which parallel jobs are queued.

The queue for cluster 731 contains parallel jobs that require six nodes. The nodes in section 741 of cluster 731, each of which contain an 'X', are being utilized to execute one of the parallel jobs in the queue for cluster 731. However, because only four nodes in cluster 731 remain available for processing grid jobs, the next job, which requires six nodes, cannot be executed. Therefore, the nodes in section 742 in cluster 731, each of which contain an 'O', remain idle even though the nodes in section 742 have resources that are available for processing grid jobs.

Similarly, the queues for clusters 732 and 734 contain parallel jobs that require eight nodes, leaving two idle nodes in each cluster. The queue for cluster 733 contains parallel jobs that require seven nodes, leaving three idle nodes.

In static scheduler 768, the queue for cluster 769 contains parallel jobs that require six nodes, leaving four idle nodes. The queue for cluster 770 contains parallel jobs that require nine nodes, leaving one idle node. The queue for cluster 771 contains parallel jobs that require six nodes, leaving four idle nodes. The queue for cluster 772 contains parallel jobs that require seven nodes, leaving three idle nodes.

Taken together, static schedulers 730 and 768 have fifty-seven unavailable nodes in section 775 that are being used to execute parallel jobs, and twenty-three available nodes in section 780 that are available for processing grid jobs. Using the process explained with respect to data processing system 500 in FIG. 5, dynamic grid scheduler 720 creates a dynamic grid scheduling policy using the resource availability information, the set of static scheduling policies, and the static scheduling statuses from static schedulers 730 and 768. In one embodiment, each of unavailable nodes 775 have a state of 'busy' or 'dedicated,' while each of available nodes 780 have a state of 'free' or 'non-dedicated.'

Dynamic grid scheduler may then allocate nodes in available nodes 780 to grid jobs 705. Hence, resources in available nodes 780 that would have remained idle are used for the execution of grid jobs, resulting in greater efficiency.

In one embodiment, dynamic grid scheduler 720 allocates available nodes 780 to grid joblets. Unlike parallel jobs, grid joblets may run across multiple queues, are loosely coupled, are dynamically scheduled, and typically execute in shorter time spans than parallel jobs. Also, grid joblets may form part of a larger job or grid project, such as grid project 510 in FIG. 5. Whereas parallel jobs execute at approximately the same time and communicate with one another using a message passing interface, joblets may be executed independently.

Figure 8:
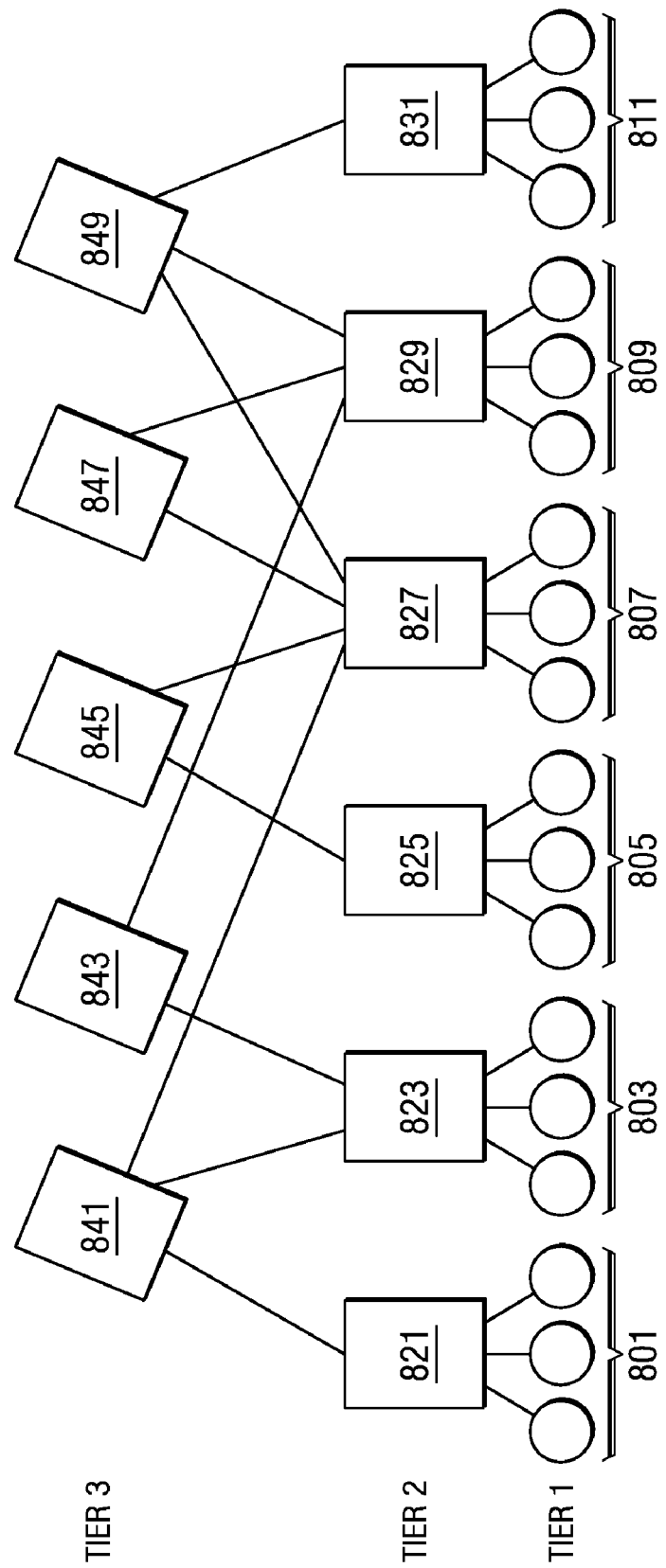
FIG. 8 is a block diagram of a system for scheduling grid jobs in accordance with an illustrative embodiment.

Turning now to FIG. 8, a block diagram of a system for scheduling grid jobs is depicted in accordance with an illustrative embodiment. Specifically, FIG. 8 shows a network of static grid scheduler and dynamic grid schedulers in a tiered environment.

Tier 1 contains static schedulers 801, 803, 805, 807, 809, and 811. Static schedulers 801, 803, 805, 1407, 809, and 811 are examples of static schedulers 530 and 568 in FIG. 5.

Tier 2 contains dynamic grid schedulers 821, 823, 825, 827, 829, and 831. Dynamic grid scheduler 821 and static scheduler 801 overlap to manage the resources managed by static scheduler 801. The function and relationship between dynamic grid scheduler 821 and static scheduler 801 is similar to the function and relationship of dynamic grid scheduler 520 and static schedulers 530 and 568 in FIG. 5.

Similarly, dynamic grid scheduler 823 and static scheduler 803 overlap to manage the resources managed by static scheduler 803. Dynamic grid scheduler 825 and static scheduler 805 overlap to manage the resources managed by static scheduler 805. Dynamic grid scheduler 827 and static scheduler 807 overlap to manage the resources managed by static scheduler 807. Dynamic grid scheduler 829 and static scheduler 809 overlap to manage the resources managed by static scheduler 809. Dynamic grid scheduler 831 and static scheduler 811 overlap to manage the resources managed by static scheduler 811.

Tier 3 contains dynamic grid schedulers 841, 843, 845, 847, and 849. The dynamic grid schedulers in Tier 2 may communicate with the dynamic grid schedulers in Tier 3 via a dynamic grid scheduler status module, such as dynamic grid scheduler status module 592 in FIG. 5.

Dynamic grid schedulers 841, 821, 823, and 827 and static schedulers 801, 803, and 807 overlap to manage the resources managed by static schedulers 801, 803, and 807. Dynamic grid schedulers 843, 823, and 829 and static schedulers 803 and 809 overlap to manage the resources managed by static schedulers 803 and 809. Dynamic grid schedulers 845, 825, and 827 and static schedulers 805 and 807 overlap to manage the resources managed by static schedulers 805 and 807. Dynamic grid schedulers 847, 827, and 829 and static schedulers 807 and 809 overlap to manage the resources managed by static schedulers 807 and 809. Dynamic grid schedulers 849, 827, 829, and 831 and static schedulers 807, 809, and 811 overlap to manage the resources managed by static schedulers 807, 809, and 811. Static schedulers and dynamic grid schedulers may be added or removed from Tiers 1-3 as desired by a particular implementation.

Figure 9:
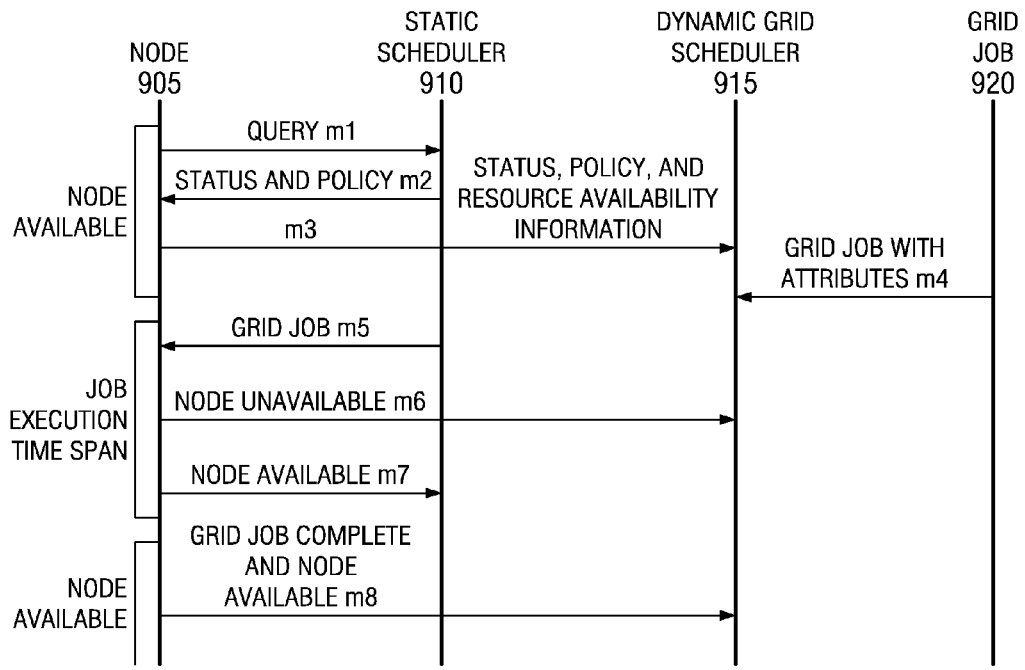
FIG. 9 is a diagram of a message flow between components of a system for scheduling grid jobs in accordance with an illustrative embodiment.

Turning now to FIG. 9, a diagram of a message flow between components of a system for scheduling grid jobs is depicted in accordance with an illustrative embodiment. Specifically, FIG. 9 illustrates a message flow between node 905, static scheduler 910, dynamic grid scheduler 915, and grid job 920. Examples of node 905 include nodes 546, 547, 549, 550, 569, 570, 579 and 581 in FIG. 5. Examples of static scheduler 910 include static schedulers 530 and 568 in FIG. 5. Examples of dynamic grid scheduler 915 and grid job 920 include dynamic grid scheduler 520 and grid job 522 in FIG. 5, respectfully.

The message flow begins when node 905 queries static scheduler 910 for the static scheduler policy and the static scheduler status of static scheduler 910 (message m1). The static scheduler status includes information about queued jobs. Static scheduler 910 passes the static scheduler status and the static scheduler policy to node 905 (message m2).

At message m3, node 905 passes the resource availability information, the static scheduler status, and the static scheduler policy for static scheduler 910 to dynamic grid scheduler 915. At message m4, a grid job 920 having job attributes is passed to dynamic grid scheduler 915. During the passage of messages m1-m4, node 905 is available for processing grid jobs. In one embodiment, node 905 has a state of 'free' during this span.

At message m5, dynamic grid scheduler 915 allocates node 905 to the execution of grid job 920. At message m6, node 905 informs dynamic grid scheduler 915 that node 905 is unavailable for executing grid jobs. In one embodiment, node 905 informs dynamic grid scheduler 915 that node 905 has a state of 'busy.'

At message m7, node 905 has completed execution of grid job 920 and informs static scheduler 910 that node 905 is available for processing additional grid jobs. During the passage of messages m5-m7, node 905 is unavailable for processing grid jobs. At message m8, node 905 informs dynamic grid scheduler 915 that grid job 920 has completed execution, and also informs dynamic grid scheduler 915 that node 905 is available for processing additional grid jobs. Any data coincident with the execution of grid job 920 may also be passed at message m8.

Figure 10:
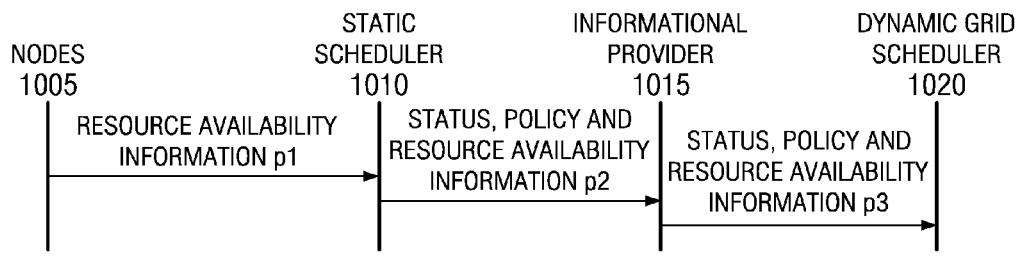
FIG. 10 is a diagram of a message flow between components of a system for scheduling grid jobs in accordance with an illustrative embodiment.

Turning now to FIG. 10, a diagram of a message flow between components of a system for scheduling grid jobs is depicted in accordance with an illustrative embodiment. Specifically, FIG. 10 illustrates a message flow between nodes 1005, static scheduler 1010, informational provider 1015, and dynamic grid scheduler 1020. Examples of nodes 1005 include nodes 546, 547, 549, 550, 569, 570, 579, and 581 in FIG. 5. Examples of static scheduler 1010 include static schedulers 530 and 568 in FIG. 5. Examples of informational provider 1015 and dynamic grid scheduler 1020 include informational providers 587 and 589 and dynamic grid scheduler 520 in FIG. 5, respectfully. FIG. 10 shows one illustrative embodiment of how resource availability information, static scheduler status, and the static scheduler policy for a static scheduler may be sent to a dynamic scheduler.

The message flow begins when nodes 1005 sends resource availability information for nodes 1005 to static scheduler 1010 (message p1). Nodes 1005 are all of the nodes that are managed by static scheduler 1010.

Upon having resource availability information for nodes 1005, static scheduler 1010 passes resource availability information, the static scheduler status, and the static scheduler policy for static scheduler 1010 to informational provider 1015 (message p2). Alternatively, resource availability information, the static scheduler status, and the static scheduler policy for static scheduler 1010 may be extracted from static scheduler 1010 by informational provider 1015. At message p3, resource availability information, the static scheduler status, and the static scheduler policy for static scheduler 1010 is passed to dynamic grid scheduler 1020.

Figure 11:
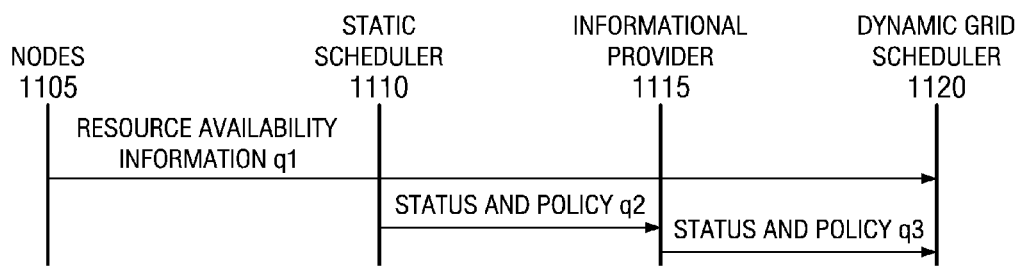
FIG. 11 is a diagram of a message flow between components of a system for scheduling grid jobs in accordance with an illustrative embodiment.

Turning now to FIG. 11, a diagram of a message flow between components of a system for scheduling grid jobs is depicted in accordance with an illustrative embodiment. Specifically, FIG. 11 illustrates a message flow between nodes 1105, static scheduler 1110, informational provider 1115, and dynamic grid scheduler 1120. Examples of nodes 1105 include nodes 546, 547, 549, 550, 569, 570, 579, and 581 in FIG. 5. Examples of static scheduler 1110 include static schedulers 530 and 568 in FIG. 5. Examples of informational provider 1115 and dynamic grid scheduler 1120 include informational providers 587 and 589 and dynamic grid scheduler 520 in FIG. 5, respectfully. FIG. 11 shows one illustrative embodiment of how resource availability information, static scheduler status, and the static scheduler policy for a static scheduler may be sent to a dynamic grid scheduler.

The message flow begins when nodes 1105 sends resource availability information for nodes 1105 to dynamic grid scheduler 1120 (message q1). Nodes 1105 are all of the nodes that are managed by static scheduler 1110. At message q2, static scheduler 1110 passes the static scheduler status and static scheduler policy for static scheduler 1110 to informational provider 1115. At message q3, informational provider 1115 passes the static scheduler status and static scheduler policy for static scheduler 1110 to dynamic grid scheduler 1120.

Turning now to FIG. 12, a block diagram of job attributes in a system for scheduling grid jobs is depicted in accordance with an illustrative embodiment. Specifically, FIG. 12 shows job attributes 1200 that are associated with a particular grid job. Job attributes 1200 are an example of job attributes that may be associated with grid jobs 505 in FIG. 5. Job attributes 1200 are also an example of the job attributes passed to dynamic grid scheduler 915 in message m4 of FIG. 9.

Job attributes 1200 include job name 1205. Job name 1205 is any name associated with a grid job. For example, job name 1205 may be given to a grid job by a user, such as user 535 in FIG. 5. Job attributes 1200 also include job priority 1210. Job priority 1210 indicates the importance of a grid job, such as the relative priority of a grid job as compared to other grid jobs.

Job attributes 1200 include job queue time 1215. Job queue time indicates the amount of time a grid job has been waiting in a job queue. Job attributes 1200 also include requested number of CPU's 1220. Requested number of CPU's is the number of CPU's that a grid job is requesting. For example, requested number of CPU's 1220 may be the number of CPU's that is deemed necessary for a grid job to successfully execute.

Job attributes 1200 include requested CPU clock speed 1225. Requested CPU clock speed 1225 is the CPU clock speed that is requested by a grid job. Job attributes 1200 also include requested disk space 1230. Requested disk space 1230 is the amount of disk space requested by a grid job. For example, requested disk space 1230 may be the amount of hard drive space that is deemed necessary for a grid job to successfully execute.

Job attributes 1200 include requested memory 1135. Requested memory 1235 is the amount of memory, such as main memory 408 of FIG. 4, which is requested by a grid job. Job attributes 1200 also include wall clock time 1240. Wall clock time is provided by a user as an estimate of the maximum amount of time the job should take to complete. The wall clock time is used by a scheduler to determine when resources should be allocated to a job to optimize overall job throughput and resource utilization. If job execution time exceeds the wall clock time, the scheduler may determine that the job is in an unknown state and terminate the job execution.

Job attributes 1200 also include associated service level 1245. Associated service level 1245 is the service level that is associated with a particular grid job. For example, associated service level 1245 may be used to determine the priority given to a grid job. In this example, a grid job with a high associated service level 1245 may be executed sooner or allocated more resources than a grid job with a low associated service level 1245.

Turning now to FIG. 13, a block diagram of resource availability information in a system for scheduling grid jobs is depicted in accordance with an illustrative embodiment. Specifically, FIG. 13 shows resource availability information 1300 for a node, such as one of nodes 546, 547, 549, 550, 569, 570, 579 and 581 in FIG. 5. Resource availability information 1300 is an example of resource availability information 580 and 582 in FIG. 5. Resource availability information 1300 is also an example of the resource availability information passed in messages m2 and m3 of FIG. 9, messages p1, p2, and p3 in FIG. 10, and message q1 in FIG. 11.

The fields shown in resource availability information 1300 are non-limiting examples of the types of information that may be indicated by resource availability information 1300. Resource availability information 1300 may include any field or parameter that indicates the availability of any resource on a node. Also, a dynamic grid scheduler, such as dynamic grid scheduler 520 in FIG. 5, has the ability to define additional parameters for resource availability information 1300. For example, a dynamic grid scheduler may define an "application licensing" field in resource availability information 1300 that indicates whether a resource has a licensed copy of an application.

Resource availability information 1300 contains machine field 1305. Machine field 1305 indicates a model, manufacturer, or brand name of a node. For example, machine field 1305 indicates the maker and model of "Blade14.austin.ibm.com."

Resource availability information 1300 contains architecture field 1310. Architecture field 1310 indicates the processing architecture of the resource. For example, architecture field 1310 indicates that a particular node has an "Intelx86" architecture typical of Pentium and Xeon processors. Other architecture types include the UltraSparc from Sun Microsystems, Inc.® and the PA-RISC from Hewlett Packard Company®.

Resource availability information 1300 contains operating system field 1315. Operating system field 1315 indicates one or more operating systems that are executing on a node. For example, operating system field 1315 indicates the operating system Linux™ is executing on a particular node.

Resource availability information 1300 contains total virtual memory field 1320. Total virtual memory field 1320 indicates the total amount of virtual memory on a node. Alternatively, total virtual memory field 1320 may indicate the amount of available virtual memory on a node. For example, total virtual memory field 1320 indicates that '2,031,464' Kilobytes of virtual memory is available on a particular node.

Resource availability information 1300 contains total disk space field 1325. Total disk space field 1325 indicates the total amount of disk space on a node disk, such as hard disk drive 426 in FIG. 4. Alternatively, total disk space field 1325 may indicate the available amount of disk space on a node. For example, total disk space field 1325 indicates that '21,940,568' Kilobytes of disk space is available on a particular node.

Resource availability information 1300 contains total CPU's field 1330. Total CPU's field 1330 indicates the total number of CPU's on a node. Alternative, total CPU's field 1330 may indicate the available number of CPU's on a node. For example, total CPU's field 1330 indicates that '4' CPU's are available on a particular node.

Resource availability information 1300 contains total memory field 1335. Total memory field 1335 indicates the total amount of memory on node memory, such as main memory 408 in FIG. 4. Alternatively, total memory field 1335 may indicate the available amount of memory on a node. For example, total memory field 1335 indicates that 2,534 Kilobytes of memory is available on a particular node.

Turning now to FIG. 14, a block diagram of a static scheduler status in a system for scheduling grid jobs is depicted in accordance with an illustrative embodiment. Specifically, FIG. 14 shows static scheduler status information 1400 for a static scheduler, such as static schedulers 530 and 568 in FIG. 5. Static scheduler status information 1400 is an example of static scheduler status 584 and 585 in FIG. 5. Static scheduler status information 1400 is also an example of the static scheduler status passed in messages m2 and m3 of FIG. 9, messages p2 and p3 in FIG. 10, and messages q2 and q3 in FIG. 11.

Static scheduler status information 1400 contains three columns that each correspond to a job priority. Specifically, column 1401 contains various fields regarding high priority jobs in a job queue, such as job queues 543 and 578 in FIG. 5. Column 1403 contains various fields regarding medium priority jobs in a job queue. Column 1406 contains various fields regarding low priority jobs in a job queue.

Number of high priority jobs queued field 1410 indicates the number of high priority jobs that are queued in a static scheduler, such as static schedulers 530 and 568 in FIG. 5. Number of medium priority jobs queued field 1420 indicates the number of medium priority jobs that are queued in a static scheduler. Number of low priority jobs queued field 1430 indicates the number of low priority jobs that are queued in a static scheduler.

Minimum and maximum number of CPU's requested fields 1411 and 1412 indicate the minimum and maximum of number of CPU's requested by any particular high priority job queued in a static scheduler. For example, if a scheduler has a job queue with multiple high priority jobs, and the least number of CPU's requested by any particular high priority job in the job queue is two, then minimum number of CPU's requested field 1411 would be populated with "2." In this example, if the maximum number of CPU's requested by any particular high priority job in the job queue is six, then maximum number of CPU's requested field 1412 would be populated with "6."

Similarly, minimum and maximum number of CPU's requested fields 1421 and 1422 indicates the minimum and maximum of number of CPU's requested by any particular medium priority job queued in a static scheduler. Also, minimum and maximum number of CPU's requested fields 1431 and 1432 indicates the minimum and maximum number of CPU's requested by any particular low priority job queued in a static scheduler.

Minimum and maximum disk space requested fields 1413 and 1414 indicate the minimum and maximum amount of disk space requested by any particular high priority job queued in a static scheduler. Similarly, minimum and maximum disk space requested fields 1423 and 1424 indicate the minimum and maximum amount of disk space requested by any particular medium priority job queued in a static scheduler. Also, minimum and maximum disk space requested fields 1433 and 1434 indicate the minimum and maximum amount of disk space requested by any particular low priority job queued in a static scheduler.

Minimum and maximum memory requested fields 1415 and 1416 indicate the minimum and maximum amount of memory requested by any particular high priority job queued in a static scheduler. Similarly, minimum and maximum memory requested fields 1425 and 1426 indicate the minimum and maximum amount of memory requested by any particular medium priority job queued in a static scheduler. Also, minimum and maximum memory requested fields 1435 and 1436 indicate the minimum and maximum amount of memory requested by any particular low priority job queued in a static scheduler.

Minimum and maximum job wait time fields 1417 and 1418 indicate the minimum and maximum amount of time that any particular high priority job has been queued in a static scheduler. Similarly, minimum and maximum job wait time fields 1427 and 1428 indicate the minimum and maximum amount of time that any particular medium priority job has been queued in a static scheduler. Also, minimum and maximum job wait time fields 1437 and 1438 indicate the minimum and maximum amount of time that any particular low priority job has been queued in a static scheduler.

Any of the fields indicated by static scheduler status information 1400 may be used to define a dynamic scheduler policy, such as dynamic grid scheduling policy 575 in FIG. 5. For example, a dynamic scheduler policy may indicate that a dynamic grid scheduler should not allocate available resources to a grid job if maximum job wait time field 1418 is greater than one hour.

Figure 15:
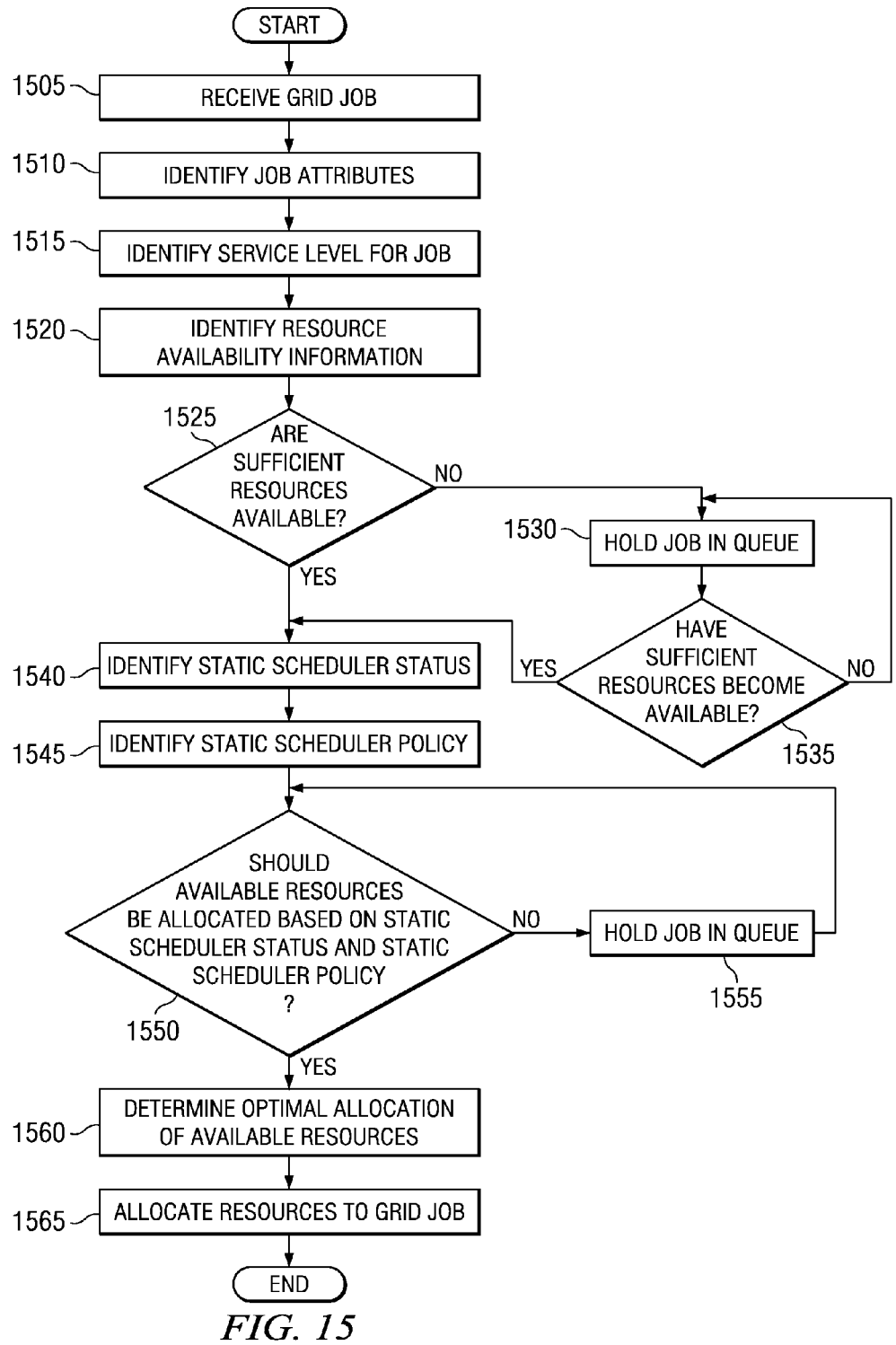
FIG. 15 is a flowchart illustrating a process for scheduling grid jobs in accordance with an illustrative embodiment.

Turning now to FIG. 15, a flowchart illustrating a process for scheduling grid jobs is depicted in accordance with an illustrative embodiment. The process illustrated in FIG. 15 may be implemented by a dynamic grid scheduler, such as dynamic grid scheduler 520 in FIG. 5.

The process begins by receiving a grid job (step 1505). The process identifies job attributes of the grid job (step 1510). The process identifies a service level for the grid job (step 1515). The process then identifies resource availability information (step 1520).

The process determines whether sufficient resources are available to execute the grid job (step 1525). If the process determines that sufficient resources are not available to execute the grid job, the process holds the grid job in a job queue (step 1530). The process then determines whether sufficient resources have become available to execute the grid job (step 1535). If the process determines that sufficient resources have not become available to execute the grid job, the process returns to step 1530. If the process determines that sufficient resources have become available to execute the grid job, the process proceeds to step 1540.

Returning to step 1525, if the process determines that sufficient resources are available to execute the grid job, the process identifies or extracts the static scheduler status from a static scheduler (step 1540). The process then identifies or extracts the static scheduler policy for a static scheduler (step 1545).

The process determines whether available resources should be allocated to the grid job based on the static scheduler status and static scheduler policy (step 1550). If the process determines that available resources should not be allocated to the grid job based on the static scheduler status and static scheduler policy, the process holds the grid job in a job queue (step 1555). The process then returns to step 1550.

Returning to step 1550, if the process determines that available resources should be allocated to the grid job based on the static scheduler status and static scheduler policy, the process determine the optimal allocation of available resources to the grid job (step 1560). The process then allocates the available resources to the grid job (step 1565). The process then terminates.

Turning now to FIG. 16, a flowchart illustrating a process for scheduling grid jobs is depicted in accordance with an illustrative embodiment. The process illustrated in FIG. 16 may be implemented by an informational provider, such as informational providers 587 and 589 in FIG. 5.

The process begins by receiving a static scheduler policy for a static scheduler (step 1605). The process receives the static scheduler status for a static scheduler (step 1610). The process receives the resource availability information for a static scheduler (step 1615).

The process determines whether the static scheduler policy, static scheduler status, or the resource availability information needs to be translated before being sent to a dynamic scheduler (step 1620). In one example, the static scheduler policy, static scheduler status, or the resource availability information needs to be translated if the format of the static scheduler policy, static scheduler status, or the resource availability information is non-recognizable to the dynamic grid scheduler. In this example, the static scheduler policy, static scheduler status, or the resource availability information may be translated from a local format that is non-recognizable to dynamic grid scheduler to a format that is recognizable by dynamic grid scheduler. If the process determines that the static scheduler policy, static scheduler status, or the resource availability information needs to be translated, then the process translates the static scheduler policy, static scheduler status, or the resource availability information (step 1625). The process then proceeds to step 1630.

Returning to step 1620, if the process determines that the static scheduler policy, static scheduler status, or the resource availability information does not need to be translated, the process sends the static scheduler policy, static scheduler status, and the resource availability information to the dynamic grid scheduler (step 1630). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments described herein provide a computer-implemented method, apparatus, and computer program product for scheduling grid jobs. In one embodiment, a process identifies information describing available resources on a set of nodes to form resource availability information.

The process identifies a set of static scheduling policies for a set of static schedulers that manage the set of nodes. The process also identifies a static scheduling status for a portion of the set of static schedulers. [00186] The process creates a dynamic grid scheduling policy using the resource availability information, the set of static scheduling policies, and the static scheduling status. The process also schedules a set of grid jobs for execution by the available resources using the dynamic grid scheduling policy. The set of grid jobs is one or more grid jobs.

In another embodiment, the process receives the resource availability information, the set of static scheduling policies, and the scheduling status from a set of informational providers. In this embodiment, the resource availability information, the set of static scheduling policies, and the static scheduling status may be received from the set of informational providers in response to querying the set of informational providers.

In an alternate embodiment, the process receives the resource availability information, the set of static scheduling policies, and the static scheduling status from a set of dynamic grid scheduling agents. Each of the set of dynamic grid scheduling agents is located in one of the set of nodes. In this embodiment, the resource availability information, the set of static scheduling policies, and the static scheduling status may be received from the set of dynamic grid scheduling agents in response to querying the set of dynamic grid scheduling agents.

In another embodiment, the dynamic grid scheduling policy is an optimal allocation of the available resources to the set of grid jobs. The set of job attributes describes one or more properties of one or more grid jobs.

Forming a dynamic scheduling policy from resource availability information, static scheduler policies, and static scheduler statuses to manage grid jobs in a heterogeneous grid computing environment leads to higher utilization rates for resources in the computing grid. Unlike static scheduling policies, which specialize only in particular types of application, the dynamic scheduling policy takes into account all applications dealt with by different static schedulers.

Also, because the dynamic scheduling policy cooperates with a heterogeneous mix of static schedulers, the illustrative embodiments may used for different vendor models and versions of static schedulers. Therefore, static scheduler that specialize in particular types of application are allowed to continue concentrating on those particular types of applications, while a dynamic grid scheduler utilizes any resources that fail to be fully utilized by the static schedulers.

The illustrative embodiments allow nodes in a computing grid to be efficiently utilized even in non-peak usage conditions. For example, nodes in a computing grid may be utilized to handle grid jobs that fall outside the scope of the static scheduling policy to which the node belongs.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system apparatus, or device.

The medium can be an electronic, magnetic, optical, or semiconductor system (or apparatus or device). Examples Of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of scheduling a set of grid jobs, the method comprising:
Identifying, by one of a set of dynamic arid scheduling agents, wherein at least one dynamic grid scheduling agent in the set of dynamic grid scheduling agents is located in one node in a set of nodes, information describing available resources on the set of nodes on a grid computing system to form resource availability information;
Identifying, by the one of the set of dynamic arid scheduling agents, a set of static scheduling policies for a set of static schedulers that manage the set of nodes, wherein the set of static schedulers comprise a plurality of static schedulers in a heterogeneous environment, the plurality of static schedulers comprising different properties;
Identifying, by the one of the set of dynamic grid scheduling agents, a static scheduling status for at least a portion of the set of static schedulers;
receiving on a computer, in a dynamic grid scheduler, information comprising the resource availability information, the set of static scheduling policies and the scheduling status from one of a set of informational providers, wherein each of the informational providers of the set of informational providers is configured to extract, from a different subset of the set of dynamic scheduling agents in the heterogeneous environment, information comprising a corresponding portion of the identified resource availability information, the identified set of static scheduling policies and the identified static scheduling status; the informational providers provide the extracted information to the dynamic grid scheduler in a format recognized by the dynamic grid scheduler;
creating by the computer a dynamic grid scheduling policy using the provided resource availability information, the provided set of static scheduling policies, the provided static scheduling status, and a set of job attributes required by the set of grid jobs, wherein each grid job in the set of grid jobs may have a different job attribute; and
scheduling by the computer the set of grid jobs for execution by the available resources using the dynamic grid scheduling policy.

2. The method of claim 1, further comprising receiving the resource availability information, the set of static scheduling policies, and the static scheduling status from the set of informational providers in response to querying the set of informational providers.

3. The method of claim 1, wherein a number of informational providers in the set of informational providers equals a number of static schedulers in the set of static schedulers.

4. The method of claim 1, further comprising:
receiving the resource availability information, the set of static scheduling policies, and the static scheduling status from a set of dynamic grid scheduling agents, wherein each dynamic grid scheduling agent in the set of dynamic grid scheduling agents is located in one node in the set of nodes.

5. The method of claim 4, further comprising receiving the resource availability information, the set of static scheduling policies, and the static scheduling status from the set of dynamic grid scheduling agents in response to querying the set of dynamic grid scheduling agents.

6. The method of claim 4, further comprising receiving the resource availability information, the set of static scheduling policies, and the static scheduling status from the set of dynamic grid scheduling agents on a predetermined periodic basis.

7. The method of claim 4, further comprising receiving the resource availability information, the set of static scheduling policies, and the static scheduling status from the set of dynamic grid scheduling agents in response to resources becoming available on at least one node in the set of nodes.

8. The method of claim 1, wherein the set of job attributes required by the set of grid jobs is selected from the group consisting of job priority, job queue time, requested number of central processing units (CPU's), requested CPU clock speed, requested disk space, requested memory, wall clock time, and associated service level.

9. The method of claim 1, wherein the set of static scheduling policies are a set of user-definable static scheduling policies.

10. The method of claim 1, wherein the set of grid jobs do not require parallel processing.

11. The method of claim 1, further comprising:
providing the resource availability information, the set of static scheduling policies, and the static scheduling status to another dynamic grid scheduler.

12. The method of claim 1, wherein the dynamic grid scheduling policy is an optimal allocation of the available resources to the set of grid jobs.

13. The method of claim 1, wherein the grid computing system is a heterogeneous grid computing system.

14. A computer program product for scheduling a set of grid jobs, the computer program product comprising:
one or more computer-readable tangible storage devices;
program instructions, stored on at least one of the one or more storage devices, to identify, by one of a set of dynamic grid scheduling agents, wherein at least one dynamic grid scheduling agent in the set of dynamic grid scheduling agents is located in one node in a set of nodes, information describing available resources on the set of nodes on a grid computing system to form resource availability information;
program instructions, stored on at least one of the one or more storage devices, to identify, by the one of the set of dynamic grid scheduling agents, a set of static scheduling policies for a set of static schedulers that manage the set of nodes, wherein the set of static schedulers comprise a plurality of static schedulers in a heterogeneous environment, the plurality of static schedulers comprising different properties;

program instructions, stored on at least one of the one or more storage devices, to identify, by the one of the set of dynamic grid scheduling agents a static scheduling status for at least a portion of the set of static schedulers;

program instructions, stored on at least one of the one or more storage devices, to receive, at a dynamic grid scheduler, information comprising the resource availability information, the set of static scheduling policies and the scheduling status from one of a set of informational providers, wherein each of the informational providers of the set of informational providers is configured to extract, from a different subset of the set of dynamic grid scheduling agents in the heterogeneous environment, information comprising a corresponding portion of the identified resource availability information the identified set of static scheduling policies and the identified static scheduling status; the informational providers provide the extracted information to the dynamic grid scheduler in a format recognized by the dynamic grid scheduler;

program instructions, stored on at least one of the one or more storage devices, to create a dynamic grid scheduling policy using the provided resource availability information, the provided set of static scheduling policies, the provided static scheduling status, and a set of job attributes required by the set of grid jobs, wherein each grid job in the set of grid jobs may have a different job attribute; and program instructions, stored on at least one of the one or more storage devices, to schedule a set of grid jobs for execution by the available resources using the dynamic grid scheduling policy.

15. The computer program product of claim 14, further comprising:
program instructions, stored on at least one of the one or more storage devices, to query the set of informational providers for the resource availability information, the set of static scheduling policies, and the scheduling status.

16. The computer program product of claim 14, further comprising:
program instructions, stored on at least one of the one or more storage devices, to receive the resource availability information, the set of static scheduling policies, and the static scheduling status from a set of dynamic grid scheduling agents, wherein each dynamic grid scheduling agent in the set of dynamic grid scheduling agents is located in one node in the set of nodes.

17. The computer program product of claim 16, further comprising:
program instructions, stored on at least one of the one or more storage devices, to query the set of dynamic grid scheduling agents for the resource availability information, the set of static scheduling policies, and the static scheduling status.

18. The computer program product of claim 16, wherein the program instructions to receive the resource availability information, the set of static scheduling policies, and the static scheduling status from the set of dynamic grid scheduling agents receive the resource availability information, the set of static scheduling policies, and the static scheduling status from the set of dynamic grid scheduling agents on a predetermined periodic basis.

19. The computer program product of claim 14, further comprising:
  program instructions, stored on at least one of the one or more storage devices, to create the dynamic grid scheduling policy using a set of job attributes required by the set of grid jobs.

20. The computer program product of claim 14, wherein the dynamic grid scheduling policy is an optimal allocation of the available resources to the set of grid jobs.

21. A data processing system comprising:
  one or more computer-readable tangible storage devices, one or more processors, and one or more computer-readable memories;
  program instructions, stored on at least one of the one or more storage devices for execution by at least one of the one or more processors via at least one of the one or more memories, to identify, by one of a set of dynamic grid scheduling agents, wherein at least one dynamic grid scheduling agent in the set of dynamic grid scheduling agents is located in one node in a set of nodes and the set of dynamic grid scheduling agents are included in the program instructions, information describing available resources on the set of nodes on a grid computing system to form resource availability information;
  program instructions, stored on at least one of the one or more storage devices for execution by at least one of the one or more processors via at least one of the one or more memories, to identify, by the one of the set of dynamic grid scheduling agents, a set of static scheduling policies for a set of static schedulers that manage the set of nodes, wherein the set of static schedulers comprise a plurality of static schedulers in a heterogeneous environment, the plurality of static schedulers comprising different properties;
  program instructions, stored on at least one of the one or more storage devices for execution by at least one of the one or more processors via at least one of the one or more memories, to identify by the one of the set of dynamic grid scheduling agents a static scheduling status for at least a portion of the set of static schedulers;
  program instructions, stored on at least one of the one or more storage devices for execution by at least one of the one or more processors via at least one of the one or more memories, to receive, at a dynamic grid scheduler, the resource availability information, the set of static scheduling policies and the scheduling status from one of a set of informational providers, wherein each of the informational providers of the set of informational providers is configured to extract, from a different subset of the set of dynamic grid scheduling agents in the heterogeneous environment, information comprising a corresponding portion of the identified resource availability information, the identified set of static scheduling policies and the identified static scheduling status; the informational providers provide the extracted information to the dynamic grid scheduler in a format recognized by the dynamic grid scheduler;
  program instructions, stored on at least one of the one or more storage devices for execution by at least one of the one or more processors via at least one of the one or more memories, to create a dynamic grid scheduling policy using the provided resource availability information, the provided set of static scheduling policies, the provided static scheduling status, and a set of job attributes required by a set of grid jobs, wherein each grid job in the set of grid jobs may have a different job attribute; and
  program instructions, stored on at least one of the one or more storage devices for execution by at least one of the one or more processors via at least one of the one or more memories, to schedule a set of grid jobs for execution by the available resources using the dynamic grid scheduling policy.

22. The data processing system of claim 21, further comprising program instructions, stored on at least one of the one or more storage devices for execution by at least one of the one or more processors via at least one of the one or more memories, to query the set of informational providers for the resource availability information, the set of static scheduling policies, and the scheduling status.

23. The data processing system of claim 21, further comprising program instructions, stored on at least one of the one or more storage devices for execution by at least one of the one or more processors via at least one of the one or more memories, to receive the resource availability information, the set of static scheduling policies, and the static scheduling status from a set of dynamic grid scheduling agents, wherein each dynamic grid scheduling agent in the set of dynamic grid scheduling agents is located in one node in the set of nodes.

24. The data processing system of claim 23, further comprising program instructions, stored on at least one of the one or more storage devices for execution by at least one of the one or more processors via at least one of the one or more memories, to query the set of dynamic grid scheduling agents for the resource availability information, the set of static scheduling policies, and the static scheduling status.

25. The data processing system of claim 21, further comprising program instructions, stored on at least one of the one or more storage devices for execution by at least one of the one or more processors via at least one of the one or more memories, to create the dynamic grid scheduling policy using a set of job attributes required by the set of grid jobs.

26. The data processing system of claim 21, wherein the dynamic grid scheduling policy is an optimal allocation of the available resources to the set of grid jobs.

* * * * *